US010433021B2

(12) United States Patent
Christoph et al.

(10) Patent No.: US 10,433,021 B2
(45) Date of Patent: Oct. 1, 2019

(54) GEOLOCATION BASED CONTENT DELIVERY NETWORK SYSTEM, METHOD AND PROCESS

(71) Applicant: George G. Christoph, London (GB)

(72) Inventors: George G. Christoph, London (GB); Henry L. Hacking, North Hollywood, CA (US); John D. Calkins, Los Angeles, CA (US); Brian K. Treadway, West Hollywood, CA (US)

(73) Assignee: George G. Christoph, London (GB)

( * ) Notice: Subject to any disclaimer, the term of this patent is extended or adjusted under 35 U.S.C. 154(b) by 89 days.

(21) Appl. No.: 15/263,229

(22) Filed: Sep. 12, 2016

(65) Prior Publication Data

US 2017/0078760 A1 Mar. 16, 2017

Related U.S. Application Data

(60) Provisional application No. 62/217,555, filed on Sep. 11, 2015.

(51) Int. Cl.
*H04N 21/61* (2011.01)
*H04W 4/029* (2018.01)
(Continued)

(52) U.S. Cl.
CPC ..... *H04N 21/6125* (2013.01); *H04L 65/4084* (2013.01); *H04N 21/2143* (2013.01);
(Continued)

(58) Field of Classification Search
None
See application file for complete search history.

(56) References Cited

U.S. PATENT DOCUMENTS 5,611,050 A 3/1997 Theimer et al.
2003/0011467 A1* 1/2003 Suomela ................ G08C 17/02 340/7.1

(Continued)

OTHER PUBLICATIONS

WO, PCT/EP2016/071463 ISR and Written Opinion, dated Mar. 13, 2017.

*Primary Examiner* — Ricky Chin
(74) *Attorney, Agent, or Firm* — One LLP; Joseph K. Liu; Takashi Hashimoto

(57) ABSTRACT

A system and method for generating revenue for content distributors (e.g., studios) and location based viewing retailers (e.g., exhibitors) is provided. The system extends the viewing retailer footprints outside the various venues (e.g., into homes and mobile devices), using virtual seats that are associated to a particular location based on geography, and by making content available to consumers that might otherwise be either unavailable and/or inconvenient. The system comprises a control circuitry configured to: to receive, using a communications circuitry, a first location information from a first client device; to determine, using a location engine, a geographical location of the first client device using the first location information; and to send, using a content distribution engine, the content to a second client device based on the determined geographical location of the first location information, even if the first and second devices are contained in a single device.

24 Claims, 19 Drawing Sheets

1600

1602 Defining a geographic boundary of a theatre

1604 Determining geolocation of purchased remote seat

1606 Determining whether remote seat is within geographic boundary of the theatre 1608 Providing content list and allow purchase of remote seat

(51) Int. Cl.

| | |
|---|---|
| ***H04N 21/45*** | (2011.01) |
| ***H04N 21/258*** | (2011.01) |
| ***H04N 21/414*** | (2011.01) |
| ***H04N 21/214*** | (2011.01) |
| ***H04N 21/254*** | (2011.01) |
| ***H04N 21/2387*** | (2011.01) |
| ***H04N 21/41*** | (2011.01) |
| ***H04L 29/06*** | (2006.01) |
| ***H04L 29/08*** | (2006.01) |

(52) U.S. Cl.

CPC ..... *H04N 21/2387* (2013.01); *H04N 21/2541* (2013.01); *H04N 21/25841* (2013.01); *H04N 21/25875* (2013.01); *H04N 21/4108* (2013.01); *H04N 21/41415* (2013.01); *H04N 21/4524* (2013.01); *H04W 4/029* (2018.02); *H04L 67/02* (2013.01); *H04L 67/18* (2013.01)

(56) References Cited

U.S. PATENT DOCUMENTS

2006/0236401 A1* 10/2006 Fosdick .............. H04L 63/1458 726/25
2007/0124721 A1* 5/2007 Cowing ............ G06F 17/30041 717/100
2007/0150603 A1* 6/2007 Crull ................... G06F 17/3089 709/227
2007/0220575 A1* 9/2007 Cooper ................ H04N 7/1675 725/118
2008/0148382 A1* 6/2008 Bartholomy ............ H04L 12/66 726/11
2008/0194272 A1* 8/2008 Smith .................... G06Q 20/20 455/456.3
2010/0080163 A1* 4/2010 Krishnamoorthi .... H04L 12/189 370/312
2010/0182905 A1 7/2010 Matsushita et al.
2010/0323715 A1* 12/2010 Winters ................ G01S 5/0027 455/456.1
2011/0113116 A1* 5/2011 Burdette ........... H04L 29/12792 709/217
2011/0185042 A1* 7/2011 Wohlert .................. G06F 21/10 709/219
2012/0065944 A1* 3/2012 Nielsen ................ G06Q 10/103 703/1
2014/0068778 A1* 3/2014 Bhatia ................... H04L 63/107 726/26
2014/0113674 A1* 4/2014 Joseph .................. H04W 4/021 455/519
2014/0130179 A1* 5/2014 Wohlert .................. G06F 21/10 726/27
2014/0273911 A1* 9/2014 Dunn ...................... H04W 4/90 455/404.1
2014/0287685 A1* 9/2014 Griffin .................. H04W 12/02 455/41.2
2014/0337867 A1* 11/2014 Wilson .................... G01S 19/14 725/9
2014/0351102 A1* 11/2014 Jolliffee ................. G06Q 40/12 705/30
2016/0302067 A1* 10/2016 Shimoshimano .. G06Q 30/0601
2016/0344845 A1* 11/2016 Shuman .................. H04L 67/18
2017/0195703 A1* 7/2017 Durbha ................... H04L 47/70
2017/0317971 A1* 11/2017 Dubey .................... H04L 45/42
2018/0192104 A1* 7/2018 Splaine ............ H04N 21/25883
2018/0343606 A1* 11/2018 Gu ........................ H04W 48/20

* cited by examiner

1500

Step 1: Confirm that Consumer is located within the overlapped part of two or more Trade Areas Step 2: Identify the nearest theater that meets the requirement: "Consumer located within the theater's defined Trade Area"

Step 3: Proceed to Movie Offering according to the following rules:

| Theater | Movie Currently Showing | Movie Shown | Movie Not Shown |
|---|---|---|---|
| | Movie Offered | Movie Offered | Movie Offered |
| Partner Exhibitor | Yes | Yes | Go to Step 4 |
| Non-partner Exhibitor | No | Go to Step 4 | Go to Step 4 |

Step 4: Identify the next-nearest theater that meets the requirement: "Consumer located within the theater's defined Trade Area"

Step 5: Proceed to Movie Offering according to the rules in Step 3

Step 6: Repeat above process until either A, B or C below is valid and proceed accordingly:

Step 6 (A): Nearest theater is a Partner Exhibitor AND meets the requirements: "Consumer located within the theater's defined Trade Area" AND movie shown Step 7 (A): Proceed to Movie Offering according to the following rules:

| Theater | Movie Currently Showing | Movie Shown |
|---|---|---|
| | Movie Offered | Movie Offered |
| Partner Exhibitor | Yes | Yes |

Step 6 (B): Nearest theater is a Non-partner Exhibitor AND meets the requirements: "Consumer located within the theater's defined Trade Area" AND movie currently showing Step 7 (B): Proceed to Movie Offering according to the following rule:

| Theater | Movie Currently Showing |
|---|---|
| | Movie Offered |
| Non-partner Exhibitor | No |

Step 6 (C): No theater meets the requirements of either 6 (A) or 6 (B) above

Step 7 (C): Proceed to Movie Offering according to the following rule:

| Theater | Movie Offered |
|---|---|
| No eligible theater available | Yes |

FIG. 15

GEOLOCATION BASED CONTENT DELIVERY NETWORK SYSTEM, METHOD AND PROCESS

CROSS-REFERENCE TO RELATED APPLICATION

This application claims priority to U.S. Provisional Application No. 62/217,555 entitled "GEOLOCATION BASED CONTENT DELIVERY NETWORK SYSTEM, METHOD AND PROCESS", filed Sep. 11, 2015, which application is hereby incorporated in its entirety by reference.

FIELD OF THE INVENTION

Various aspects of the disclosure relate to content delivery, and in one aspect but not by way of limitation, to content delivery based on geolocation information.

BACKGROUND

Exclusive exhibition of various forms of content (e.g., movies, plays, concerts, and sporting events) commonly occurs in location-based venues where attendant constraints, such as limited seats and showtimes, of access for the public can greatly limit the potential reach for that content. Movies in theatres are a primary example of content with such constraints. For a new movie release, theatres typically have a limited window of exclusivity to exhibit the new movie to as many people as possible while having to balance the showtimes and seat counts among all of the movies exhibited at any given theatre.

Movies are typically released exclusively to theaters for a minimum period of 90 days. However, the bulk of people attend a new movie during the first few weeks of the release window, and the availability of each movie declining precipitously thereafter. Even for blockbuster movies, which might continue to attract high attendance in the later stage of the release window, the general availability to the public is still reduced over time as it plays on fewer screens and with fewer showtimes. During the time between the steep attendance drop and later DVD/Blu-Ray disc release, both the movie studios and theatre operators (exhibitors) are denied potential viewers due to lack of availability during the "dead period" for the film prior to DVD, as theatre operators remove lower performing movies from screens, and replace them with newer and/or better performing movies. When this dead period occurs, potential revenue for movie studios and theatre operators are lost.

Movies generally do not play in theatres for the full 90+ days of the theatrical release window because the economics of holding a screen for an entire run rarely makes sense. In a typical 90-day period, approximately 125-150 movies are released to theatres. Theatres in turn typically have between 4 and 30 screens, each seating anywhere from 30-300 people. Because of the non-continuous nature of adding seats to match the title's appeal (i.e.—a step function from 0 seats to one screen that holds 30 or more people), and the competition among movies for screen real estate, the public is usually unable to find even new movies soon after their theatrical release. Further complicating matters, scheduled showtimes cannot possibly always align with the specific needs of all members of the public, and the varying degrees of ease of access to theatres (e.g., distance, weather, geographical constraints) further combine to limit the overall revenue for any single title even at its peak moment of awareness. All of these complications translate directly to potentially thousands of lost attendances. One way to recoup some of the lost attendance is to provide an alternative way for consumers to watch movies when they cannot be found (or are hard to find) in theatres.

SUMMARY OF THE INVENTION

To address the challenges of content (e.g., movie) availability described above, content owners and exhibitors ideally should be able to sell an inventory of "virtual seats" (or remote seats) located in homes or in places that are remote to the exhibitors' venue. This will allow consumers to watch the exhibited content outside the venue (e.g., at home) and free them from the requirement of being at the venue physically. By allowing consumers to obtain virtual seats of a movie/content and to watch it outside the venue (e.g., at home), the constraints of limited seats at the venue and inflexible showtimes (i.e., exhibitor selected showtimes rather than consumer-selected) are greatly lessened. Further, the economic reality of consumers not being able to keep a particular film on screen during the entire limited exclusivity window will become less of an issue. As such, an alternative way for consumers to watch a movie during the theatrical release window or a first run movie is needed. Accordingly, a method and system for providing first run movies (or other content) to consumers for viewing outside the venue (e.g., at home) are provided.

In one aspect, a method for providing content to a set of remote viewers, at seats located outside the venue and within a geographic distribution boundary, is provided. The method comprises: defining said geographic boundary corresponding to a geographic area relating to the first venue, said geographic boundary is different from a geographic boundary of a second venue; determining (for said remote viewers of the first venue) using a location engine, the geolocation of each seat of said remote viewer; determining whether the geolocation of said seat is within said geographic boundary of the first venue; and providing said content, using a distribution engine, to each of said seats determined to be within said geographic boundary of said first venue.

In another aspect, a method for sending a content to a client device based on the client device geolocation data is provided. The method comprises receiving a first location information from a first client device. The first client device may be a television, a set-top-box, a game console, or an Internet based streaming device (e.g., OTT devices such as Roku™ and Chromecast™). The first location information of the first device may comprise one or more of an Internet Protocol (IP) address, a media access control (MAC) address, and geolocation data such as global positioning system (GPS) data (e.g., longitude and latitude). Once the first location information is received, the geographical location of the first client device is determined using the first location information.

In one aspect, the content or media is sent to a second client device based on the determined geographical location of the first location information. The first client device may be the same as the second client device. In other words, both the request for content and the display of content are performed by the same device (e.g., connected TV). In another aspect, the first client device is different than the second client device. In this scenario, the first device may be a mobile device performing the geolocation via GPS, registration and the ordering of the content. Once ordered, the content will be available for download or stream to a second display device such as a connected TV or set-top-box that was previously registered with the first device. It should be noted that the content may be a multimedia, a movie, a concert, a sporting event, a play, or any other entertainment event.

In one aspect, prior to delivering/streaming the content to the client device, the property type at the geographical location of the location information (or geolocation data) is verified. In one aspect, the content is only delivered to the client device if the type of property is determined to be a residential property or a mixed residential-commercial property. In yet another aspect, the IP address of the first location information is checked to determine whether it matches with the IP address of the second location information. Only when there is a match and upon verification that the property type is a residential type property, the content may be delivered (be available for download) or streamed to the client device or an alternative display device previously registered with the client device.

In one aspect, the method also comprises receiving a request for a listing of first run movies from the first device and locating a theatre proximate to the determined geographical location of the first client device. This creates a geo-fence around a participating theatre by assigning all registered client devices located at a residential (or mixed residential-commercial) property within X number of miles to that participating theatre, by way of selling virtual seats in the participating theatre. In this way, revenue generated via the geolocation based content delivery system and method may be shared with the participating theatre. This revenue may be reported as box office revenue for the participating theatre. In another aspect, the method also comprises receiving a request for a listing of first run movies (and/or other content) from the first device and locating a theatre proximate to the determined geographical location of the first client device. This creates a geo-fence around a non-participating theatre by geo-blocking (preventing) all registered client devices located at a residential (or mixed residential-commercial) property within X number of miles to that non-participating theatre.

In one aspect, the method also comprises retrieving a list of movies being offered by the theatre proximate to the determined geographical location and sending the list of movies to the client device. In another aspect, the method comprises receiving a request for a listing of first run movies (and/or other content) from the first device and determining a geographical location of the second device associated with the first device. The first and second client devices may be different. Once the geographical location of the second device is determined, a participating theatre proximate to the second device is located. Next, a list of movies being offered by the participating theatre is retrieved and sent to the first client device. The first client device may then place an order for a movie to be displayed on the second device. In one aspect, a portion of the revenue generated from the order is shared with the participating theatre and the movie studio.

In yet another aspect of the disclosure, a system for content delivery is disclosed. The system comprises a control circuitry configured to: receive, using a content consumption engine and the communications circuitry, a first location information from a first client device; determine, using a location engine, a geographical location of the first client device using the first location information; and send, using a content distribution engine, the content to a second client device based on the determined geographical location of the first location information.

In yet another aspect, a non-transitory processor-readable medium is disclosed. The non-transitory processor-medium comprises one or more instructions operational on a computing device, which when executed by a processor causes the processor to: receive a first location information from a first client device; determine a geographical location of the first client device using the first location information; and deliver the content to a second client device based on the determined geographical location of the first location information.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIG. 15 illustrates an exemplary process that governs content offer in accordance with an aspect of the disclosure.

DETAILED DESCRIPTION

Overview

As previously mentioned, movies sometime perform poorly at the box office because of weather, timing of the release, unfair ratings, negative reviews, and competition. Theatre operators (exhibitors) lose money whenever they dedicate an entire screening room to a low performing movie as they must pay for staffs and lose out on profits that could have been generated by screening a better performing or newer movie. As such, theatre operators tend to remove low performing movies from screening as soon as possible. Sometimes theatre operators remove a movie from screening just after 2 weeks of being released—well in advance of the end of the movie's scheduled exclusivity period. During the dead earning period between when the movie is removed from theatres and the DVD/Blu-Ray release date, both the movie studio and theatre operators will generate almost zero revenue and may even likely lose money due to cost borne from marketing, staffing, and distribution.

As such there is a need for a system and method that would allow consumers to obtain tickets and watch movies during the dead attendance period. What is needed is a system and method for streaming (or otherwise made available) first run movies (i.e., movies still in their theatrical release window and are exclusive to theatres) to consumers. The system would basically allow consumers to obtain "virtual seats" (seats located remotely and outside of the theatre) of a movie at participating theatres near their home and view the movie in the comfort of their own home. In one aspect, a consumer may only obtain virtual seats from nearby participating theatres with which the consumer's residential property is associated. This aspect of a theatre and residential properties allows the content (during the first run window, for example) to be shared with the participating theatre much like the standard brick-and-mortar revenue sharing model.

Figure 1:
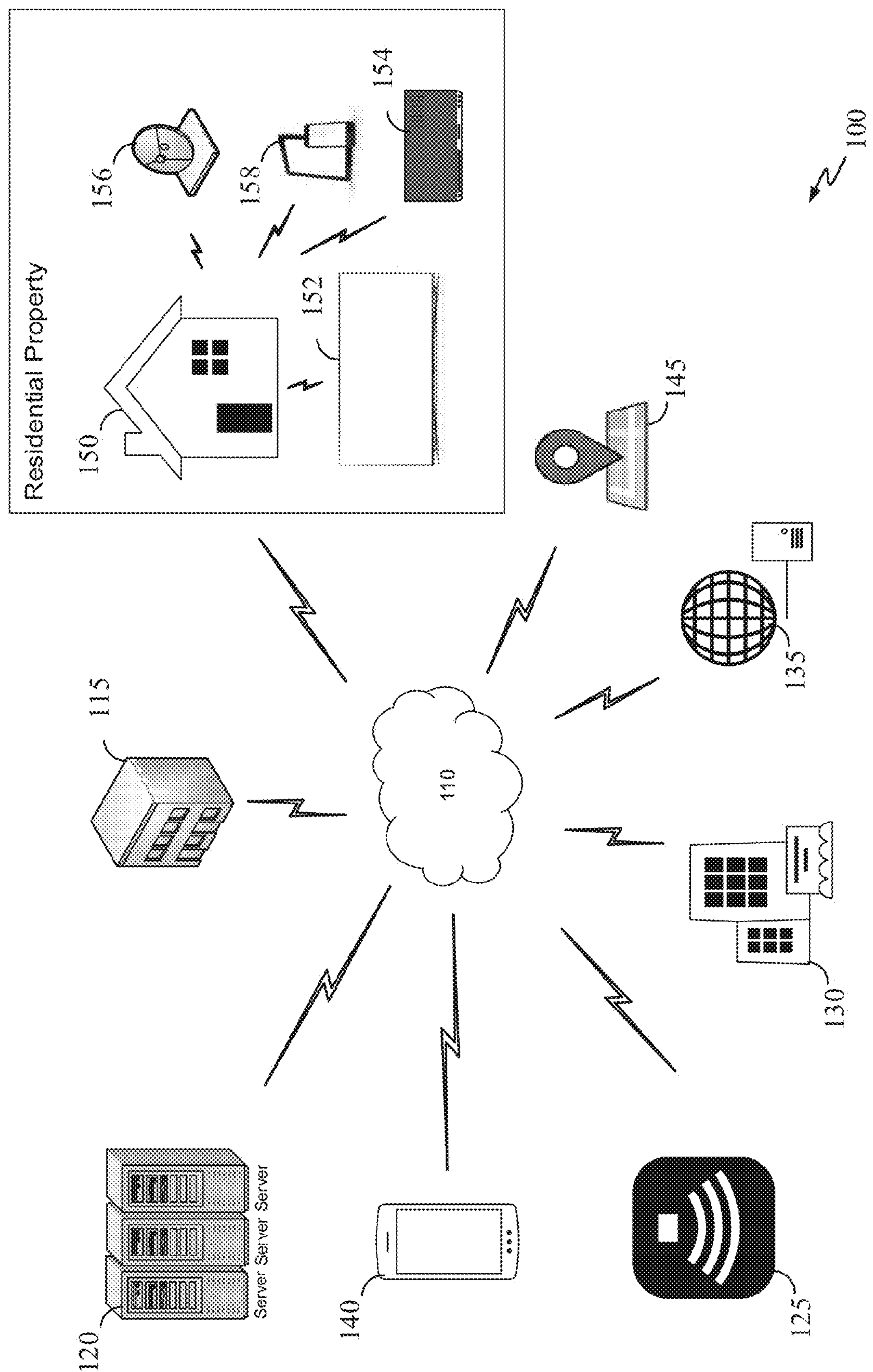
FIG. 1 illustrates an exemplary environment in which the geolocation based content delivery platform operates in accordance with an aspect of the disclosure.

FIG. 1 illustrates an exemplary environment 100 in which the method and system for geolocation based content delivery operate. As shown in FIG. 1, environment 100 includes a communication network 110, a consumer facing content portal 115, a content delivery network (CDN) 120, a theatre 125, a movie studio 130, an Internet service provider (ISP) 135, a mobile phone 140, location services 145, and a residential property 150. Operating within a local area network (LAN) of residential property 150 are items such as a connected TV 152, a game console 154, a satellite or cable set-top-box (STB) 156, and various client devices 158 (e.g., mobile phone, tablet, laptop, desktop, etc.). Consumer facing content portal 115 can also be referred to as a consumption engine which facilitates the order and consumption of content by consumers.

In one aspect, consumer facing content portal (consumption engine) 115 may be a secured computing platform having servers in various locations for hosting web sites, web applications, and application programming interfaces (API), each of which or combination thereof may be responsible for managing communication session between CDN 120, theatre 125, movie studio 130, ISP 135, mobile phone 140, location services 145, and various devices in residential property 150 in order to facilitate the first run movie (or other content) ordering and streaming process. Portal 115 may host a web site or web application for consumers to connect to using one of client devices 152, 154, 156, and 158 in order to obtain a listing of first run movies from a participating theatre proximate to their home and to obtain a virtual seat of a movie. It should be noted that content other than first run movies may be on the list such as old movies, classics, plays, sporting events, live events (e.g. pop concerts), etc. Portal 115 may also have APIs for interfacing with applications installed in connected TV 152 and other connected devices such as STB 156 and game console 154. Likewise, the API will manage the communication session between the various entities such as CDN 120, theatre 125, ISP 135, location services 145, and one of connected devices 152-158 to enable the consumer to view available first run movies or other content being offered by participating theatre 125 and to obtain virtual seats for a movie/content.

CDN 120 may comprise servers deployed in various data centers across the world. CDN 120 may store encrypted movies (including movies in their theatrical release window) provided by studio 130. Once a consumer obtains a virtual seat of a movie from theatre 125, the closest and/or fastest CDN server available for the consumer's geographical location is identified. CDN 120 may make the movie available for download or may stream the movie to HDCP (high-bandwidth digital content protection) certified IP devices located at residential property 150.

In one aspect, portal 115 may implement a session based watermarking on the movie prior to the movie being delivered or streamed to a device in residential property 150. The session based watermarking is unique for each residential property or IP address associated with residential property 150. In this way, studio 130 may detect and track down illegal copying and distribution of a movie in case the encryption mechanism is somehow compromised.

In one aspect, first run movies are only offered to residential properties. Commercial properties are not eligible because of the high risk of a mass showing. This obviously would greatly diminish the revenue capacity for the movie studios. To ensure that only residential properties can obtain virtual seats and watch first run movies, portal 115 employs an innovative geolocation based verification process and determines whether the residential property falls within a geographical distribution boundary of a participating theatre. In one aspect, the geographical location of the IP address associated with a MAC address of a client device such as connected TV 152, game console 154, and STB 156 is verified. This may be done by having a data sharing relationship with ISP 135, which provides Internet services to residential property 150. In one aspect, portal 115 communicates with ISP 135 to obtain the geographical location and/or address of residential property 150. Once property 150 is verified to be residential property such as a single family home, a condominium, or an apartment, portal 115 will authorize devices associated with the IP address of residential property 150 to receive a stream of first run movies.

In one aspect, commercial properties may be allowed to obtain virtual seats and watch first fun movies or other content but with additional requirements. In this scenario, when the display device is determined to be associated with a commercial property, portal 115 may require additional verification or information such as the number of expected viewers, the type of event, and the name of company associated with the commercial property. In one aspect, the availability of content and the pricing of a virtual seat for a commercial property may be adjusted based on one or more of the additional information. In one aspect, only a certain type of event located in a commercial property may be allowed to view and obtain a movie/content from the geolocation based content delivery platform. For example, when the geolocation of a device is associated with a commercial property, the device may still be allowed to obtain a movie if the device indicates that the event is for a child's birthday. In one aspect, once a child's birthday is the input for the type of event, then the list of available movies may be restricted by genre such as family or animation.

The additional information may also be used to perform analytics and to identify anomalies. For example, if a property—residential or commercial—has a consistent history of ordering a movie every Friday at 5 pm, it may warrant an investigation or the account holder may be required to provide additional information or the account may even be restricted.

In another aspect, only movies with a certain status will be made available for purchase by consumers in a commercial building. The status may include one or more of the number of days since released, critic reviews, and the percent of theatres screening the movie. For example, if the percent of theatres screening the movie is less than 5%, then the movie may be made available on the geolocation based content delivery platform for commercial properties. In one aspect, similar status triggers as described above may also be applicable to residential properties.

Referring again to FIG. 1, portal 115 may verify the MAC address of STB 156 with cable and satellite TV providers, when STB 156 is used to obtain virtual seats or selected as the display/rendering device, to determine whether the cable/satellite subscriber is associated with a residential or commercial account. In one aspect, STBs that are associated with commercial accounts are prohibited to participate in the geolocation based content delivery platform provided by portal 115. As such, for the purpose of IP address verification, ISP 135 may include cable and satellite providers such as Dish™, Comcast™, and DirecTV™. Alternatively, STBs that are associated with commercial accounts may participate when certain additional information is provided and certain movie status triggers are met.

Where a data sharing relationship with ISP 135 does not exist, portal 115 may verify the geographical location of an IP address of a display device (e.g., connected TV 152, a HDCP certified mobile device, an portable game console, etc.) by using the geolocation data of a location services enabled device (e.g., mobile device 158) that is also located on the same network. For example, as shown in FIG. 1, connected TV 152 and mobile device 158 (e.g., mobile phone, tablet, etc.) may both be connected to the same local area network, thus they share the same IP address when communicating with communication network 110. To verify that the IP address used by connected TV 152 is located in a residential type property, the geolocation data of mobile device 158 may be used to obtain the actual geographic location of device 158 while it is connected to the same LAN as connected TV 152. Using the geolocation data from mobile device 158, the longitude and latitude may be obtained and thereby may be used to cross reference various resources such as Bing™ Maps and Google™ Maps to determine the type of property that is located at that geographic location. In this way, the geographic location of TV 152 and the type of property where TV 152 is located can be ascertained. In one aspect, the geographic location and the property type associated with the geographic location may be determined using a location verification service/engine (not shown). This service may be part of portal 115 or may be an independently operated entity such as location services 145, which may be an IP address look-up service/company.

In one aspect, the location of mobile device 158 may be determined by triangulation with nearby cell towers. In urban or highly developed areas where cell towers are common, the triangulation location method can be sufficiently accurate to determine the type of property where the mobile device is located. Accordingly, in one aspect, the shared IP address of TV 152 and mobile device 158 and the triangulation location data of mobile device 158 may be used to verify the geographic location and the property type where both of the devices reside.

The first run content delivery/streaming platform as described above brings customers and revenue to entertainment promoters that show live events (e.g., movies, concerts, and plays) by geo-locating customers and selling virtual seats at the promoter's venue. The geolocation based content delivery platform also provides customers with a secure platform for viewing live events, where and when they want (e.g., an in-home theatre), while protecting by geo-fencing (a.k.a. geo-blocking) any pre-determined/protected trade areas. It should be noted that a venue may be a theatre, a park, a stadium, a stage, a school, a gymnasium, or any structure suitable for hosting an event.

Geolocation Based Content Delivery with ISP Relationship

Figure 2:
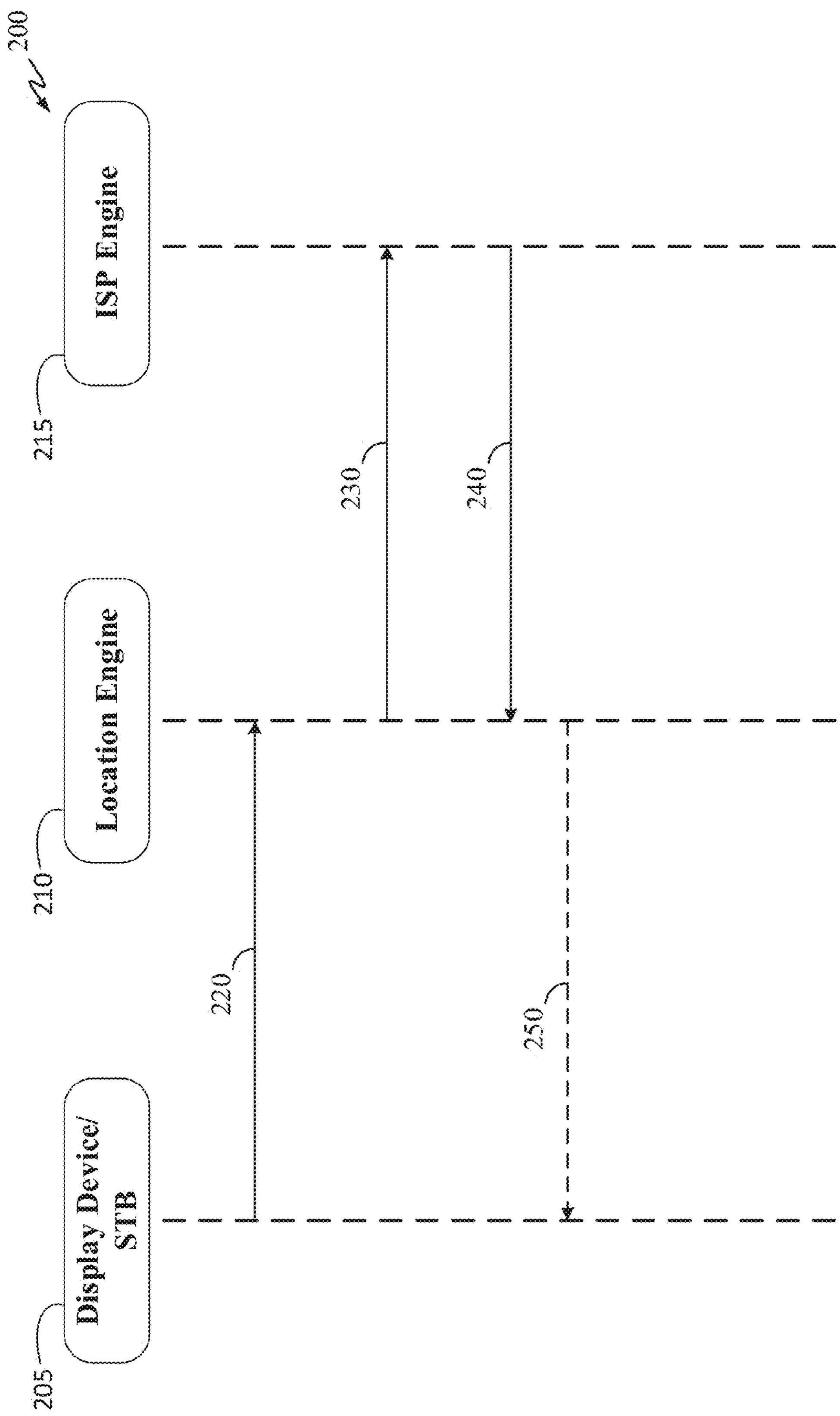
FIG. 2 illustrates an exemplary client device registration system and process with ISP relationship in accordance with an aspect of the disclosure.

FIG. 2 illustrates a registration process 200 of a display device such as connected TV 152, game console 154, and STB 156 in accordance with one aspect of the disclosure. In one aspect, a display device 205 (e.g., connected TV 152, game console 154, and STB 156) must first be registered with the system before being able to receive a list of first run movies that is available for download or streaming. Process 200 begins at 220 when display device 205 sends a registration request along with its IP address to a location engine 210. In one aspect, display device 205 also sends its MAC address to location engine 210. In one aspect, location engine 210 is a standalone location determination/verification service such as location services 145. Alternatively, location engine 210 may be a part of consumer portal 115. In one aspect, location engine 210 may be one of a plurality of APIs, residing on portal 115, that is specifically coded to determine and verify the geographical location of an IP address.

At 230, the IP address of display device 205 is sent to ISP engine 215 which is configured to determine the geographical location of display 205. ISP engine 215 is also configured to determine the property type—residential or commercial—of the structure at the determined geographical location. At 240, ISP engine 215 sends the geographical location information back to engine 210. In one aspect, ISP engine 215 may confirm to location engine 210 that the IP address of display device 205 is associated with a residential property. Once confirmed, location engine 210 may register display device 205 as an authorized display device. At 250, location engine 210 may optionally send a registration confirmation to display device 205.

In one aspect, ISP engine 215 may be part of ISP 135. Alternatively, ISP engine 215 may be one of a plurality of APIs residing on portal 115.

In one aspect, display device 205 may send a registration request and the IP address directly to portal 115, which will then communicate with location engine 210 and ISP engine 215 to complete the registration. In one aspect, ISP engine 215 may be integrated with location engine 210 to enable location engine 210 to perform all of ISP engine 215 functionalities.

Figure 3:
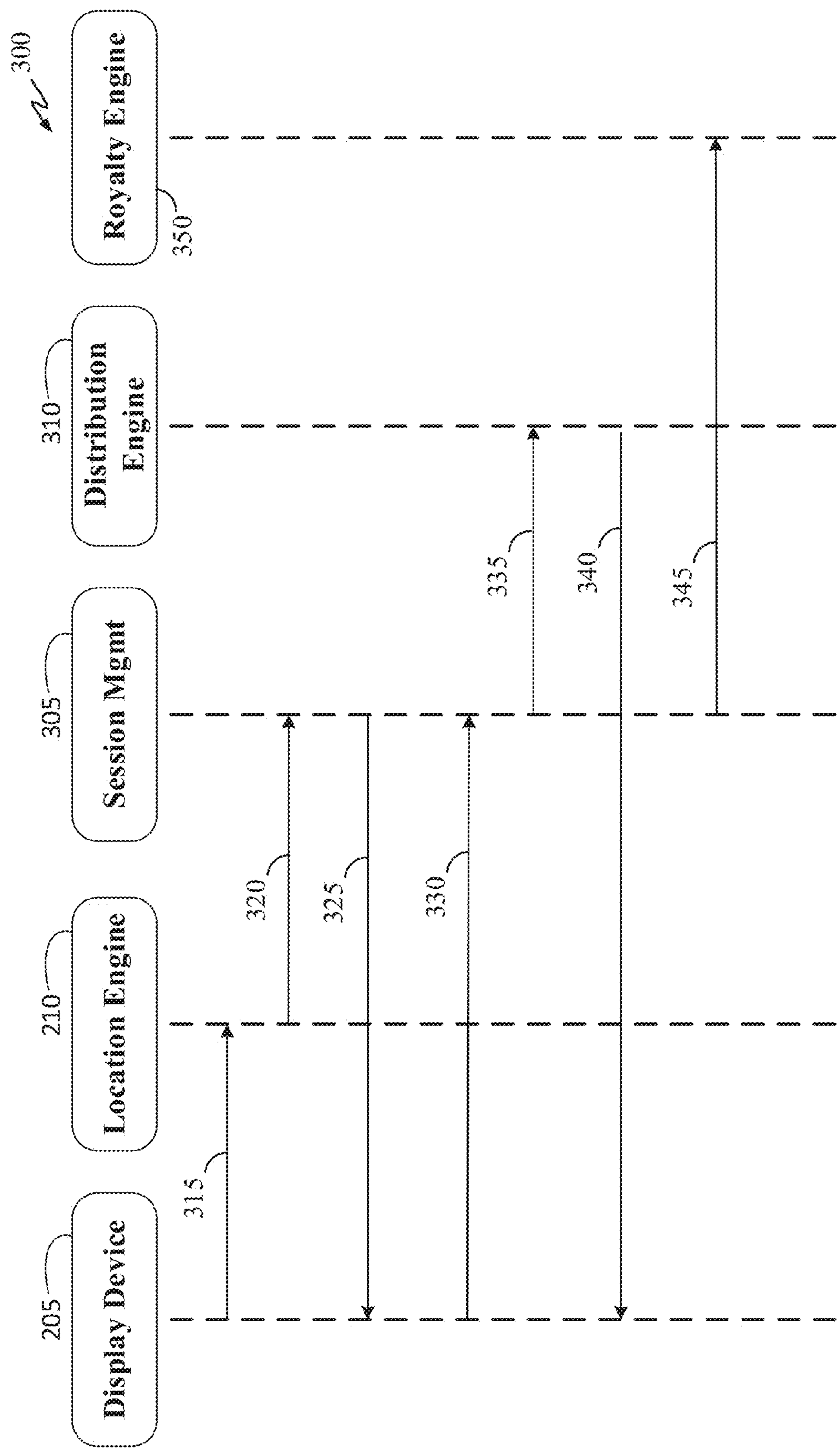
FIGS. 3-4 illustrate exemplary geolocation based content delivery systems and processes with ISP relationship in accordance with an aspect of the disclosure.

FIG. 3 illustrates a process 300 for ordering a first run movie or other content in accordance with one aspect of the disclosure. Process 300 starts at 315 where display device 205 makes a title request to location engine 210. Along with the title request, display device 205 also sends its IP address to location engine 210 for verification that the TV IP address has not changed since it was registered. Once location engine 210 confirms that the IP address for display device 205 has not changed, it forwards (at 320) the title request and the location information to a content/session management 305, which will obtain the list of first run movies at a nearby and participating theatre, based on the received location information.

In one aspect, content/session management 305 may be a part of portal 115. For example, session management 305 may be an API or a web application residing on portal 115. At 325, the listing of first run movies is sent to display device 205. At 330, display device 205 places a movie order with session management 305. At 335, session management 305 instructs a distribution engine 310 to stream the ordered movie to display 205. At 340, the ordered movie is streamed to display device 205. In one aspect, distribution engine 310 may make the movie available for download for later playback. At 345, session management 305 sends a transaction report to royalty engine 350. The transaction report may include the total sale receipt, the identification of participating theatre, and the consumer account information associated with display device 205.

Referring back to FIG. 2, although not shown in FIG. 2, session management 305 may communicate with a participating theatre within a certain distance from the geographical location of the location information to obtain a real-time listing of first run movies.

Figure 4:
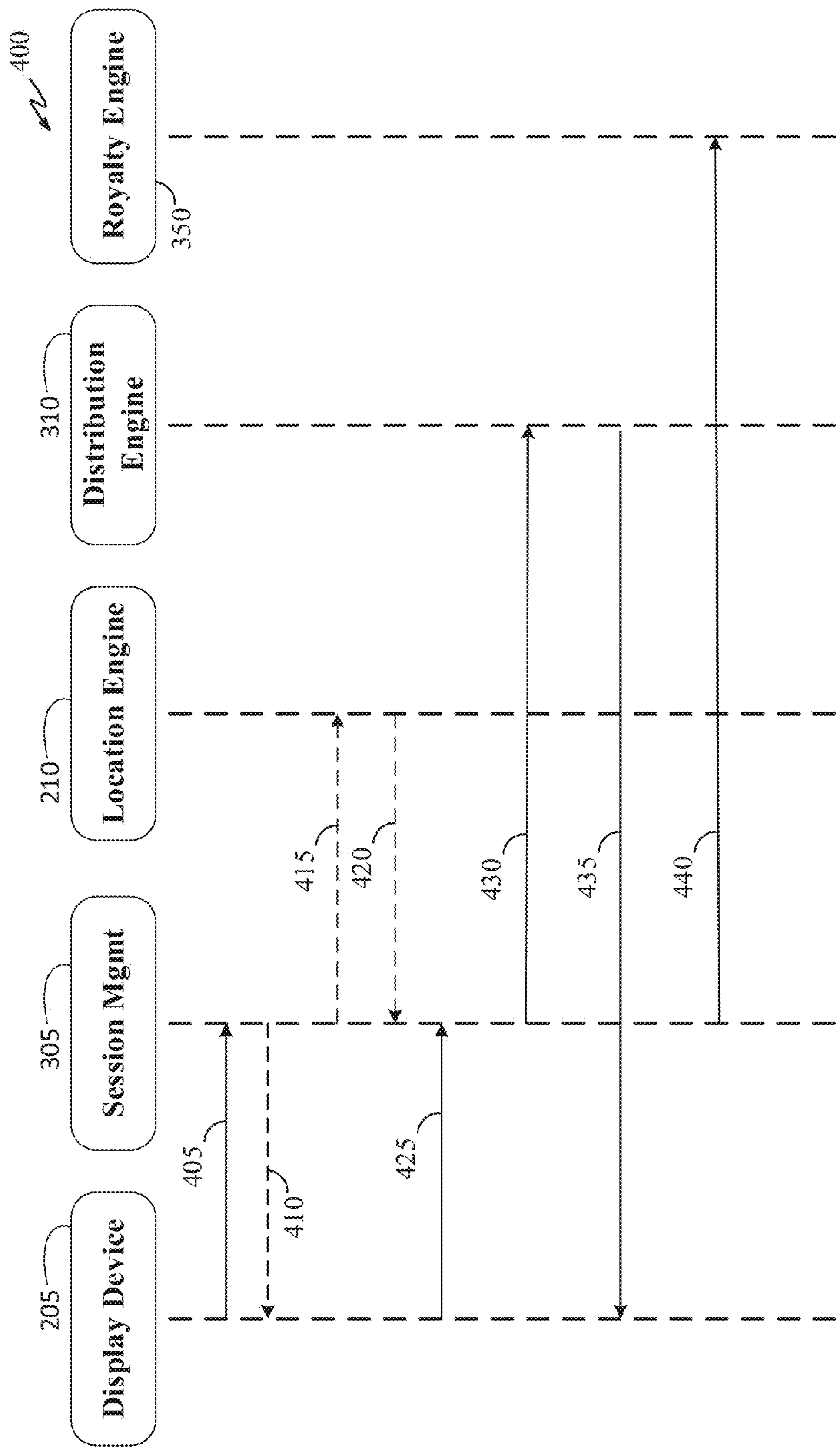

FIG. 4 illustrates a process 400 for ordering a first run movie or other content using display device 205 in accordance with one aspect of the disclosure. It should be noted that in process 400, display device 205 is already pre-registered with consumer portal 115 using an ISP location service as described in process 200. Additionally, in one aspect, the architecture of process 400 only allows display device 205 to initiate communication with session management 305. In this way, session management 305 may manage all the necessary functions/communications to enable display device 205 to order and receive a first run movie stream.

At 405, display device 205 may send a request to session management 305 for a listing of first run movies. In one aspect, display device 205 may also send the IP address and the MAC address to session management 305. However, since display device 205 is already pre-registered, session management 305 is already aware of the geographical location of display device 205 and had also verified the type of property at the geographical location of display device 205. Accordingly, at 410, upon receipt of the request for the listing of first run movies, session management 305 may immediately send the listing of first run movies back to display device 205 using a list of first run movies being offered by a participating theatre proximate to the geographical location of display device 205. In one aspect, session management 305 may re-query the participating theatre for an updated movie listing each time a request for a listing of first run movies is received from display device 205. In one aspect, the listings of all first run movies being offered by participating theatres are stored locally and are dynamically updated via API calls. In this way, session management 305 does not have to be in direct or constant communication with the participating theatre. In one aspect, session management 305 may update the listing of first run movies in real time or periodically.

In one aspect, session management 305 may optionally check whether display device 205 is currently using the same IP address as it was using when it first registered. In one aspect, at 415, session management 305 may optionally send the IP address information to location engine 210 for re-verification. At 420, location engine 210 may send to session management 305 the result of the IP address re-verification. In one aspect, steps 415 and 420 are optional and may be performed by session management 305. For example, during registration process 200, session management 305 may store the IP address and the MAC address of display device 205 after the geographical location has been determined and verified. In this way, when display device 205 makes a future request/order, session management 305 can perform a quick verification to determine whether display 205 is already registered and pre-approved without having to depend on ISP engine 135 and location services 145.

At 425, display 205 may place an order for a first run movie from the list of movies received at 410. Once session management 305 receives the order, it sends an instruction (at 430) to distribution engine 310 to stream the ordered movie to display device 205. At 435, in response to the instruction sent by session management 305, distribution engine 310 streams (or otherwise makes available) the ordered movie to display device 205. In one aspect, only HDCP certified devices can receive content stream from distribution engine 310. At 440, the revenue collected from the sale of the movie is distributed by royalty engine 350.

Location Engine

Referring to FIGS. 2, 3, and 4, it should be noted that location engine 210 may also be coded to cross reference various map resources such as Bing™ Maps and Google™ Maps to determine the type of property located at a specific geographic location. In one aspect, location engine 210 may be coded to perform triangulation using nearby cell towers to determine the location of a device. In urban or highly developed areas where cell towers are common, the triangulation location method can be sufficiently accurate to determine the type of property where the mobile device is located. Accordingly, in one aspect, location engine 210 may verify the geographic location and the property type where both of the devices are located by using 1) the shared IP address of connected TV 152 and mobile device 158; and 2) the triangulation location data of mobile device 158.

Once the geolocation of the mobile device is determined, location engine 210 locates the nearest theatre to the mobile device by determining which one of a theatre's geographical distribution boundary contains the geolocation of the mobile device. Location engine 210 may include a venue database containing locations of venues (e.g. movie theatres, concert halls, and stadiums) and their respective trade area. The venue database may comprise, but is not limited to, proprietary software and/or third-party database and/or API's. If the venue database is a separate entity, the location engine 210 may be configured to query the venue database to obtain the geographic distribution boundary for a particular theatre. It should be noted session management 305 or any one of the plurality of APIs of portal 115 may also be configured to perform this task.

In one aspect, geolocation data may include a latitude, a longitude, and an accuracy factor. Location engine 210 may check whether the geolocation received from mobile device 158 has the desired accuracy. If the accuracy factor of the geolocation data does not meet the minimum accuracy requirement, then the location verification process fails and further access to the system by the mobile device is denied.

In one aspect, location engine 210 uses a third party geolocation API to get the street address of the user and store it into profile for future use.

In another aspect, location engine 210 determines the nearest movie theater by first arranging two or more nearby theatres by distance from the geolocation of a device (e.g., mobile device 158). Location engine 210 then determines each of the theatres' geographical distribution area radius or boundary (the distribution area does not have to be a circle) and checks to see if the geolocation of device 158 falls within any of theatre's distribution boundary. If, for example, the geolocation of device 158 falls only in the distribution boundary for theatre A, then device 158 is assigned to theatre A. In other words, a geo-fence is established for theatre A and device 158, which will prevent other theatres from streaming content to device 158. In one aspect, if device 158 falls within the distribution boundary of two participating theatres, then the closest theatre by distance is assigned to be the partner theatre.

In one aspect, the radius of the geographical distribution area of a theatre is determined based one or more of the area population density, the number of residential units, spending habits, and the demographics of the population.

Geolocation Based Delivery with No ISP Relationship

Figure 5:
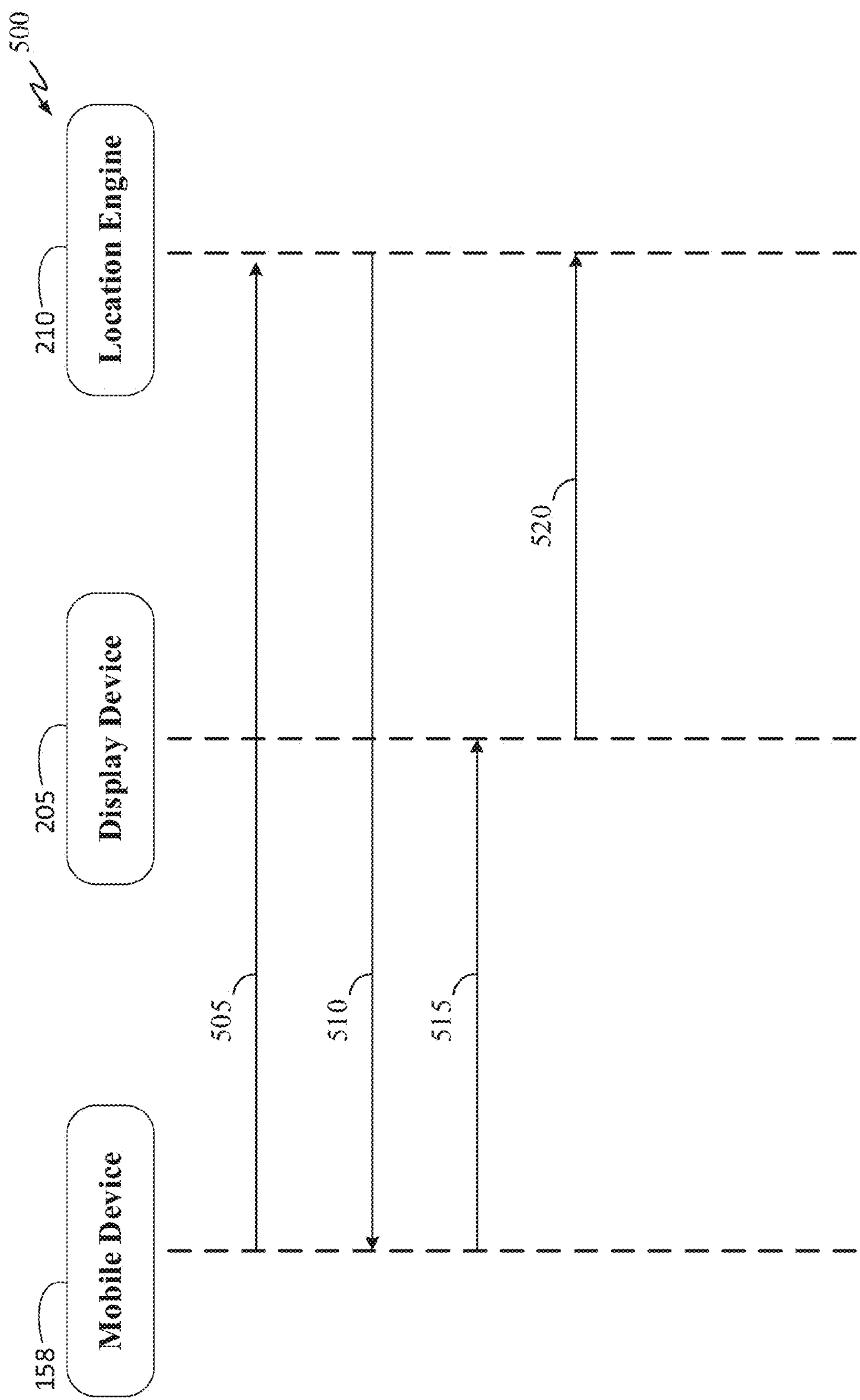
FIG. 5 illustrates an exemplary client device registration system and process with no ISP relationship in accordance with an aspect of the disclosure.

FIG. 5 illustrates a process 500 for performing registration with session management 305, which may serve as the consumer facing portal for content including first run movies, in accordance with an aspect of the disclosure. In process 500, location determination and property type verification is not available through ISP 135. As such, display device 205 must verify its location and property type using the geolocation information of mobile device 158, which is also on the same home network (or local area network) as display device 205.

Registration process 500 starts at 505 where mobile device 158 sends a registration request, the geolocation information, and its IP address to location engine 210. In one aspect, location engine 210 may be an independent location verification service such as location services 145. Alternatively, location engine 210 may be an integrated portion (one of a plurality of web applications or APIs) of portal 115. Using the geolocation information provided by mobile device 158, location engine 210 may determine what type of structure/property is located at that particular geolocation. In another aspect, location engine 210 may provide one or more of the services provided by ISP service 135 and location services 145 such as address lookup, property type verification, GPS location services, triangulation location services, and femtocell location services.

If the type of structure/property is residential, then location engine 210 will allow registration to proceed and send a code to mobile device 158 at 510. If the type of structure/property is commercial in nature, then registration will be denied. In one aspect, if the type of structure/property is a mixed commercial and residential structure/property, then registration may be allowed depending on the latitude information and the address provided by the consumer. For example, if the latitude information indicates that the mobile device is 40 feet higher than the base elevation for that specific location, then it could indicate that the mobile device is in a condominium structure/property where there are commercial spaces on the first and/or the second floor. At 515, the registration code received by mobile device 158 may then be manually entered into display device 205. Here, display device 205 is a connected TV using a geolocation based first run movie app, however because no ISP relationship is present, display device 205 must be registered concurrently with mobile device 158. At 520, display device 205 may send the code and its IP address to location engine 210. If the IP address of display device 205 matches with the IP address of mobile device 158, then both the mobile and display devices will be registered. If the IP addresses do not match, then registration is denied. It should be noted that mobile device 158 has to be on the same home network with display device 205 in order for registration to be successful. In one aspect, all of the digits of the IP address of display device 205 must match with all of the digits of the IP address of mobile device 158. In another aspect, only a portion of the IP address of display device 205 must match with a portion of the IP address of mobile device 158. In other words, a portion of devices 158 and 205 IP addresses may be different (e.g., the very last digit) as long as the portions that are similar indicate an IP address of a single source such as an Internet modem/router.

Figure 6:
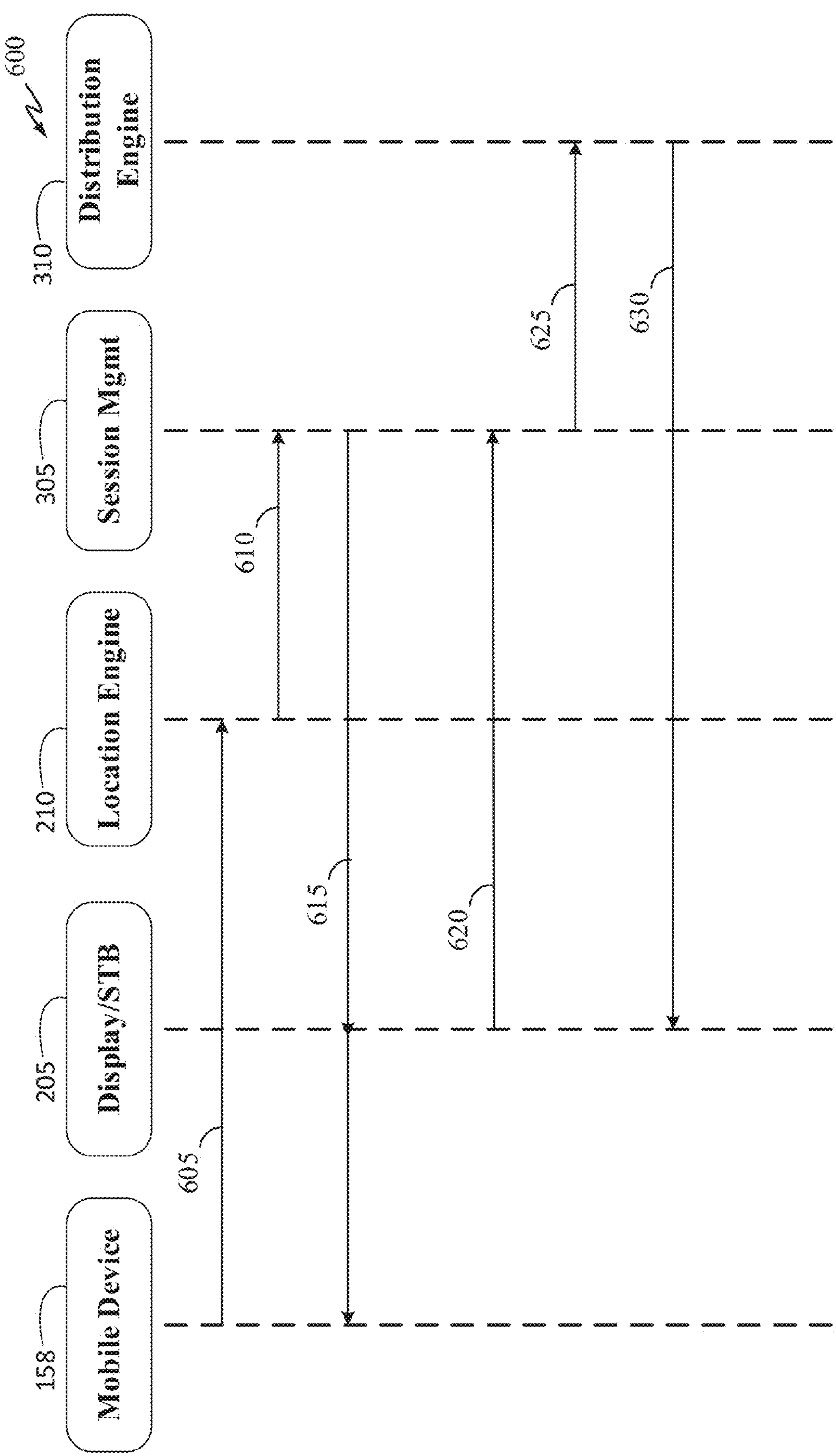
FIGS. 6-7 illustrate exemplary geolocation based content delivery systems and processes with no ISP relationship in accordance with one or more aspects of the disclosure.

FIG. 6 illustrates a process 600 for ordering a first run movie or other content in accordance with an aspect of the disclosure. Process 600 starts at 605 where mobile device 158 sends a request for a list of first run movies to location engine 210. Along with the listing request, mobile device 158 also sends its location information to location engine 210. In one aspect, the location information may comprise one or more of an IP address, geolocation data (e.g., GPS data), and a MAC address.

Once the IP address of mobile device 158 is received, location engine 210 may determine whether the IP address was previously registered. If yes, location engine 210 may retrieve the geographical location associated with the IP address of mobile device 158. At 610, location engine 210 forwards the geographical location information and the request for the listing of first run movies (or other content) to session management 305, which then retrieves the participating theatre for that geographical location. In one aspect, session management 305 sends a request to the participating theatre for an updated list of movies for which virtual seats can be obtained.

At 615, session management 305 sends the listing of first run movies to display device 205 and/or mobile device 158. At 620, display device 205 purchases a virtual seat for one of the first run movies and the order is sent to session management 305. In one aspect, after the purchase is confirmed, session management 305 sends an instruction (at 625) to distribution engine 310 to stream the purchased movie to display device 205. At 630, distribution engine 310 streams the movie to display device 205.

In one aspect, process 600 requires both mobile device 158 and display device 205 to be pre-registered using registration process 200 or 500. In one aspect, steps 605 and 610 may be optional. In this scenario, mobile device 158 may send the request for the listing of first run movies and its location information directly to session management 305. As previously mentioned, the location information may comprise one or more of an IP address, a MAC address, and the geolocation information of mobile device 158. Since both mobile device 158 and display device 205 are preregistered, session management 305 should already have the geographical location and participating theatre associated with the pre-registered IP address. In other words, session management 305 may send a list of first run movies directly to the mobile device in response to the request. As previously mentioned, it should be noted that content other than first run movies may be on the list such as old movies, classics, plays, sporting events, live events (e.g. pop concerts), etc."

Figure 7:
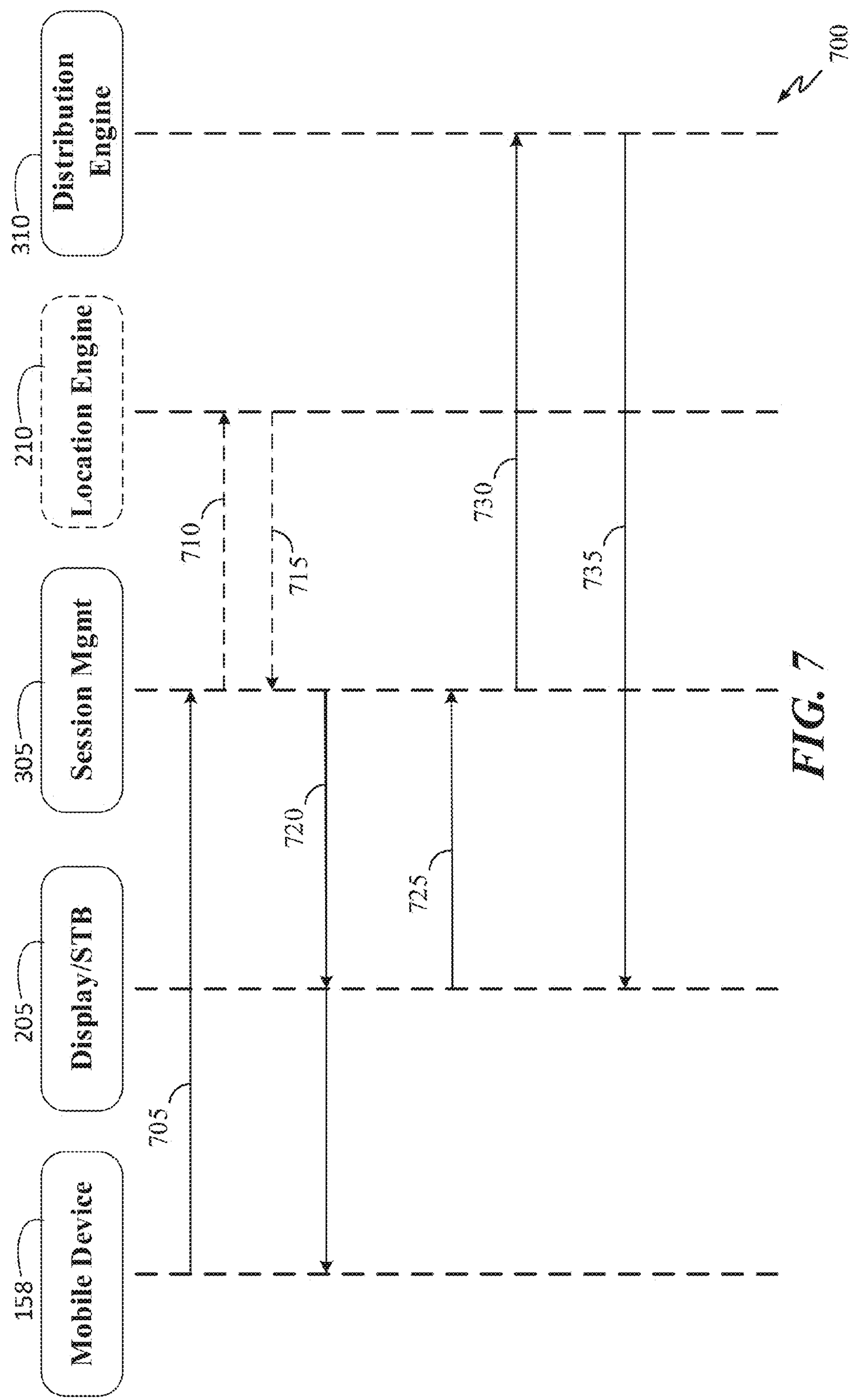

FIG. 7 illustrates a process 700 for ordering a multimedia content (e.g., first run movie) in accordance with one aspect of the disclosure. In process 700, mobile device 158 communicates directly with session management 305 to request a list of first run movies and to order a movie or a virtual seat. In this architecture, session management 305 acts as the main portal for mobile device 158 and also for display device 205. In one aspect, session management 305 is configured to perform registration verification, new device registration, identification of participating theatre or venue near mobile device 158 or display device 205, obtaining an updated listing of first run movies from participating theatre, sending the listing of first run movies to requesting device, receiving order of a virtual seat, and instructing a movie to be streamed to a particular device. To perform all of these functions, session management 305 is configured to communicate with theatre 125, location engine 210, and distribution engine 310 using a communication circuit/engine (not shown). It should be noted that theatre 125 may be a park, a stadium, a stage, a school, a gymnasium, or any structure suitable for hosting an event.

As shown in FIG. 7, mobile device 158 sends a request for a listing of first run movies to session management 305, which then checks with location engine 210 to determine whether mobile device 158 is already registered at 710. At 715, location engine 210 sends back at least one of the geographical location of mobile device 158 and the participating theatre assigned to that particular geographical location. At 720, session management 305 then sends the listing of movies to mobile device 158 and display device 205. In one aspect, steps 710 and 715 involving location engine 210 are optional as session management 305 may incorporate all of the functionalities of location engine 210. In other words, session management 305 may determine the registration status and location of mobile device 158 if it has already been pre-registered using process 500, for example.

At 725, display device 205 purchases a virtual seat of a first run movie by making the purchase request to session management 305. Once the purchase is confirmed, session management 305 instructs distribution engine 310 to stream the movie to display device 205 at 730. At 735, distribution engine 310 streams the movie to display device 205. In one aspect, distribution engine 310 may comprise CDN 120, which may comprise servers deployed in various locations. CDN 120 may store encrypted movies provided by studio 130 and may include watermarking features/patterns as specified by session management 305. In one aspect, session management 305 assigns a unique watermarking pattern to each stream of a first run movie. The watermarking pattern may be assigned and sent to distribution engine 310 at 730. In one aspect, distribution engine 310 may encode the watermarking pattern in real-time as the movie is being streamed to display device 205.

In one aspect, the watermarking pattern may be the IP address or the MAC address of the mobile or display device. The watermarking pattern may be discrete and not noticeable by the human eye. This implementation may enable studios to easily track down any illegal conversion and distribution of movies exhibited on the geolocation based content delivery platform and thereby reducing piracy.

Remote Ordering

In a situation where the account owner is not at home, it is desirable to enable the account holder to nevertheless order movie for people (e.g., children) at home. Accordingly, a process 800 for remotely ordering a first run movie is provided in accordance with an aspect of the disclosure. Process 800 describes a situation where the consumer can obtain, using mobile phone 140, a virtual seat (order a first run movie) from a participating theatre near their home devices (e.g., devices 152-158) while away from home. It should be noted that mobile phone 140 may be running a first run movie (FRM) application (not shown) that is configured to communicate with portal 115 or session management 305. The FRM application residing on mobile phone 140 may include a user interface (UI) for the user to select a pre-registered display device while the user is away from home. Alternatively, the user may register a new remote display device. However, the remote display device must be in a geographical area where ISP service 135 is available. In other words, a new remote display device can be registered, but the ISP or cable/satellite relationship must exist in order for the geolocation and the property type where the remote display device resides can be verified. In one aspect, a new remote display device can be registered without ISP services; however, the remote display device must have its own location services capability. For example, a remote display device such as a tablet with GPS and cellular or 4G/5G capability may be registered.

Figure 8:
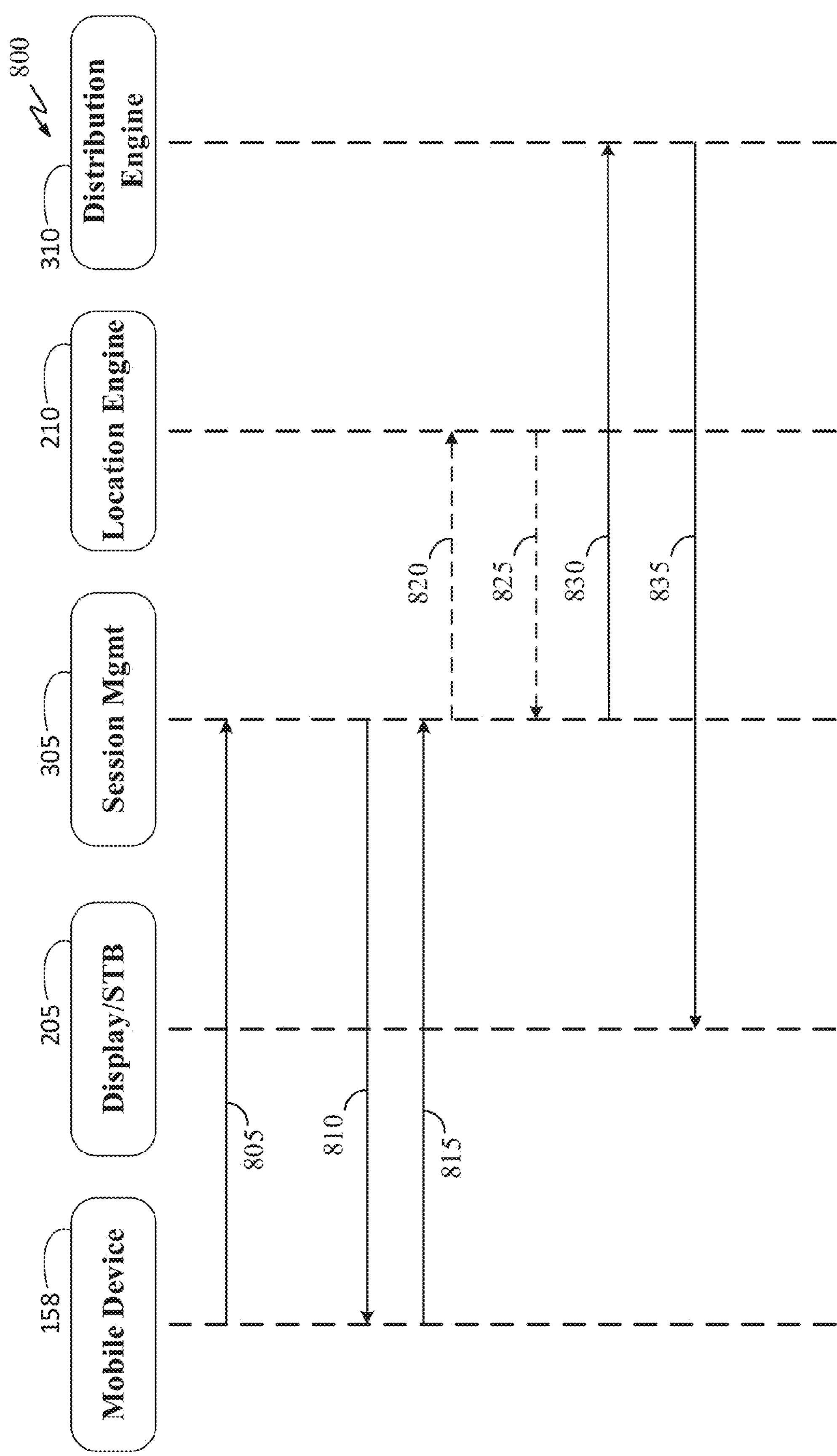
FIGS. 8-9 illustrate exemplary mobile device initiated geolocation based content delivery systems and processes with no ISP relationship in accordance with one or more aspects of the disclosure.

As shown in FIG. 8, process 800 begins at 805 when mobile device 158 selects a remote display device and concurrently requests a listing of first run movies (or other content) at the participating theatre assigned to the pre-registered remote display device. In response to the request, session management 305 sends the list of first run movies to mobile phone 140. Session management 305 may also send the list of first run movies/content to the pre-registered display device. At 815, mobile phone 140 sends an order request of a movie to session management 305.

In one aspect, prior to instructing distribution engine 310 to stream the movie to display device 205, session management 305 may optionally verify (at 820 and 825) the IP and MAC addresses of the selected display device (made at step 805) to determine if the selected display device is already registered. In one aspect, session management 305 may verify pre-registration and location with location engine 210.

In response to the purchase request at 815, session management 305 instructs distribution engine 310 to stream the first run movie or content (e.g., music, multimedia, play, concert, etc.) to the display device selected at 805.

Multiple Subscriber Accounts

Figure 9:
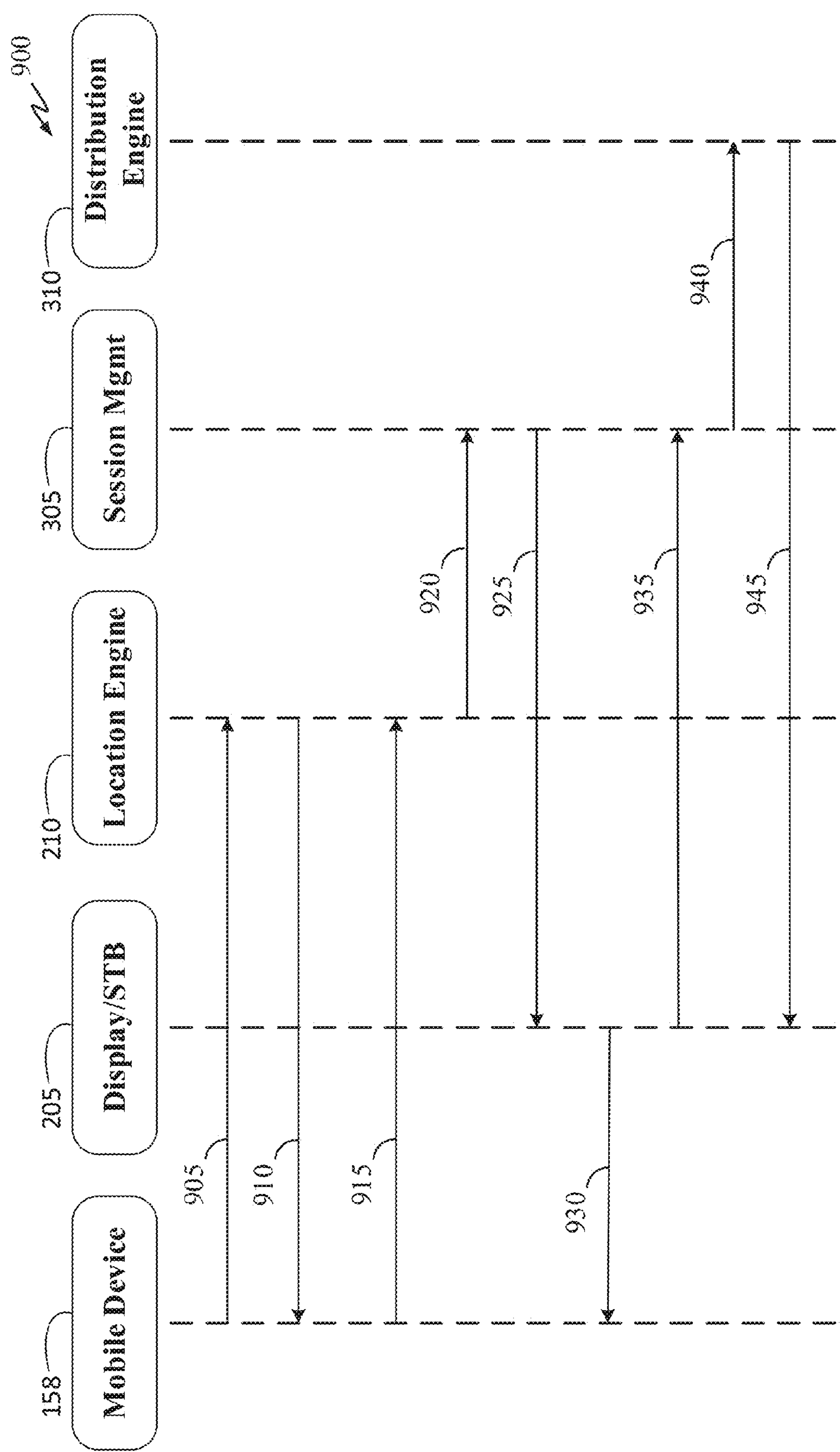

Certain households will have multiple subscribers. Those subscribers may all live in the same household but some may not. For example, a father and daughter may each have their own accounts. However, both accounts are administered by one owner, namely the father. FIG. 9 illustrates a process 900 for ordering a first run movie in a multiple subscriber accounts situation in accordance with one aspect of the disclosure. Process 900 starts at 905 where mobile device 158 sends a title request to location engine 210. Along with the title request, mobile device 158 also sends the location information and the IP address to engine 210. Location engine 210 may then retrieve one or more display devices and their IP addresses associated with mobile device 158. Location engine 210 then sends a list of available display devices to mobile device 158 at 910.

At 915, mobile device 158 selects a display device and sends the selection back to location engine 210, which then forwards the title request and location information of the selected display device to session management 305 at 920. Upon receiving the location information of the selected display device (e.g., connected TV 152, game console 154, and STB 156), session management 305 determines the participating theatre assigned to the geographical location of the selected display device. Session management 305 then retrieves the list of first run movies and/or other content being offered by the participating theatre and sends it to the selected display device 205 and mobile device 158 at 925 and 930, respectively. At 935, display device 205 sends a purchase request of a movie to session management 305, which then instructs distribution engine 310 to stream the purchased movie to display device 205 at 940. At 945, display device 205 receives the movie stream.

Figure 10:
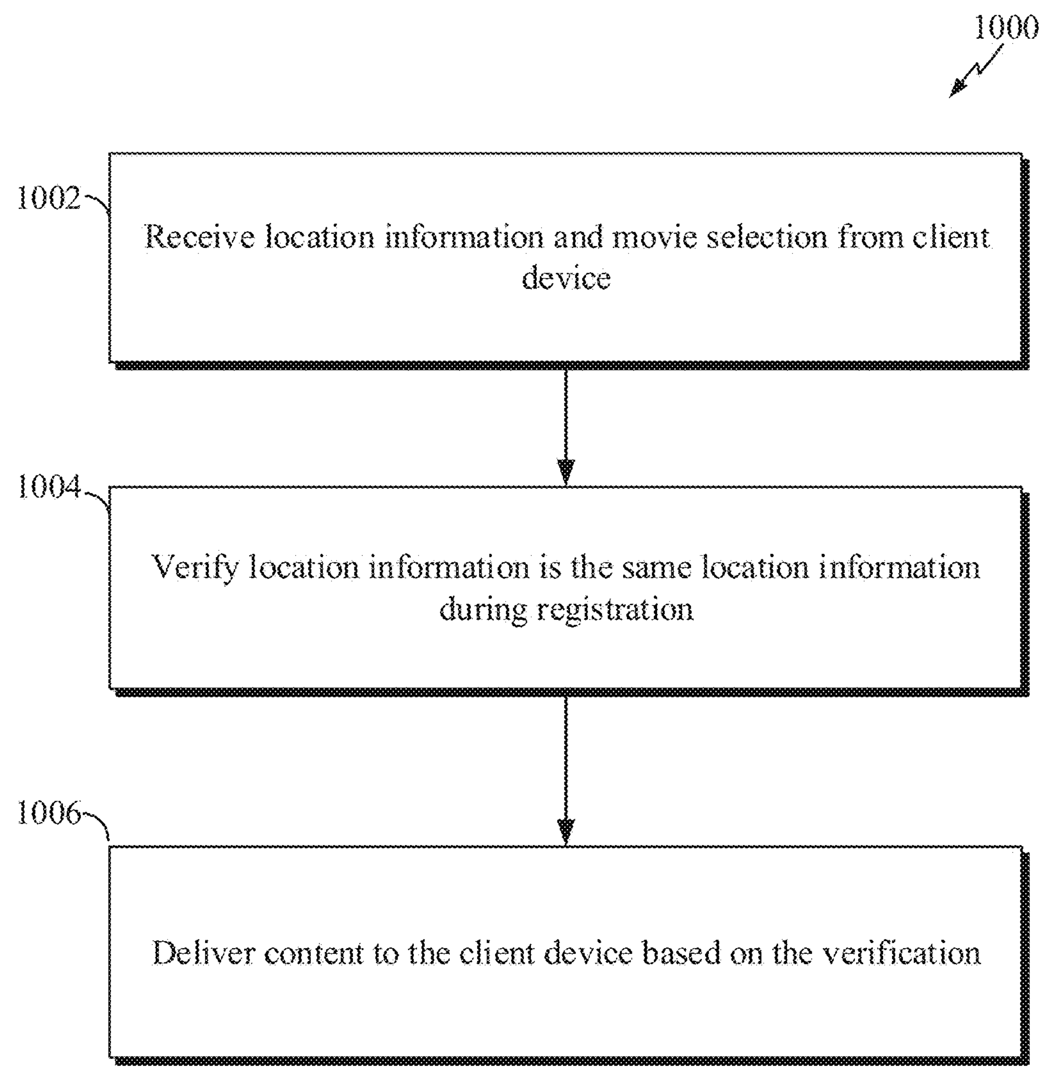
FIG. 10 illustrates an exemplary server-side registration and geolocation based content delivery process in accordance with an aspect of the disclosure.

FIG. 10 illustrates a process 1000 for registering a client device and ordering a first run movie or other content in accordance with one aspect of the disclosure. On a high level, process 1000 describes the logical procedure for registering a new client device using ISP location services. In other words, there exists a relationship between portal 115 and the client device Internet service provider (ISP). The main function of ISP service 135 is to provide the physical/geographical address associated to the IP address of the client device. Using the address, the type of structure/property at that physical location can be ascertained.

As shown in FIG. 10, at 1002 the location information of a client device is received by portal 115, location engine 210, or session management 305. As previously mentioned, portal 115 may comprise of one or more APIs. Location engine 210 and session management 305 may be one of the APIs in portal 115. At 1004, the geographic location of the client device is determined using the received location information, which may comprise one or more of an IP address, geolocation data (e.g., GPS data), and the MAC address of the client device.

At 1006, the type of property associated with the determined geographical location (e.g., street address) may be verified. In one aspect, once the client device is verified, its IP address and MAC address are stored and flagged as registered. The client device is then made eligible to receive streaming of first run movies. In this way, a client device may only need to be registered once. At 1008, the content is delivered to the client device based on the result of the verification. In one aspect, the content is only delivered to the client device if the type of property is a residential property. Otherwise, if the type of property is commercial property, then the content is not delivered as the client device would become ineligible to participate in the virtual seat streaming program. It should be noted that content on the geolocation based content delivery platform may also be made available to commercial property, but only with additional information and/or status triggers as previously described.

Figure 11:
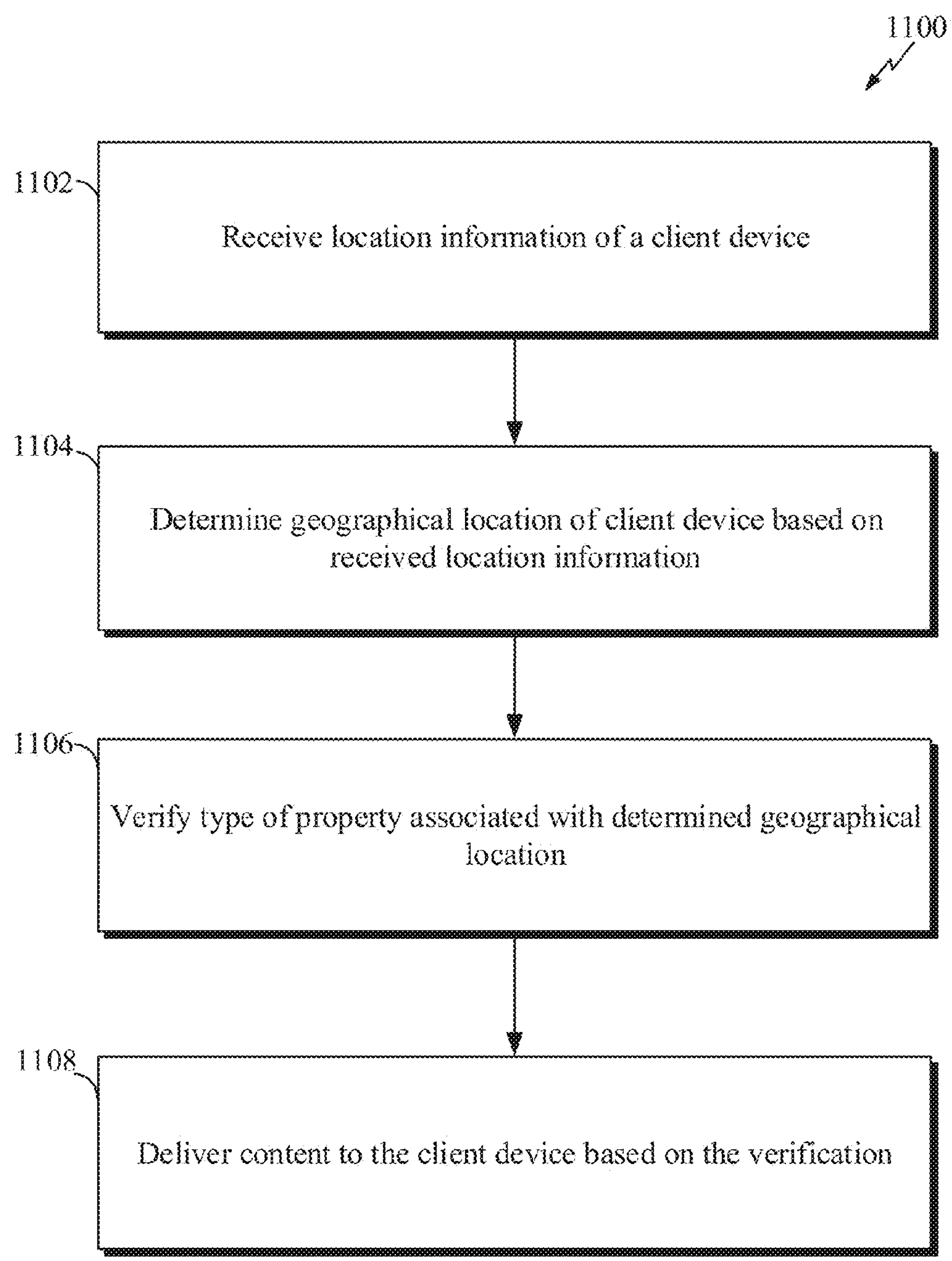
FIG. 11 illustrates an exemplary server-side geolocation based content delivery process in accordance with an aspect of the disclosure.

FIG. 11 illustrates a process 1100 for purchasing a first run movie or other content in accordance with an aspect of the disclosure. In process 1100, the location information is received from a client device along with a purchase request for a first run movie at 1102. In one aspect, the location information is received by session management 305 or location engine 210. At 1104, the received location information is verified with the location information used by the same client device when it first registered. In one aspect, the verification is performed by location engine 210, which may comprise ISP service 135 and location services 145. In another aspect, the verification may be done by session management 305. At 1106, the movie/content is streamed to the client device based on the verification.

In one aspect, the client device at 1102 may be the same as the client device receiving the stream at 1108. Alternatively, the client device at 1102 may be mobile device 158 and the client device at 1108 may be connected TV 152. This involves a situation where the mobile device is used to register and order the movie, but a different display device is selected for viewing.

Figure 12:
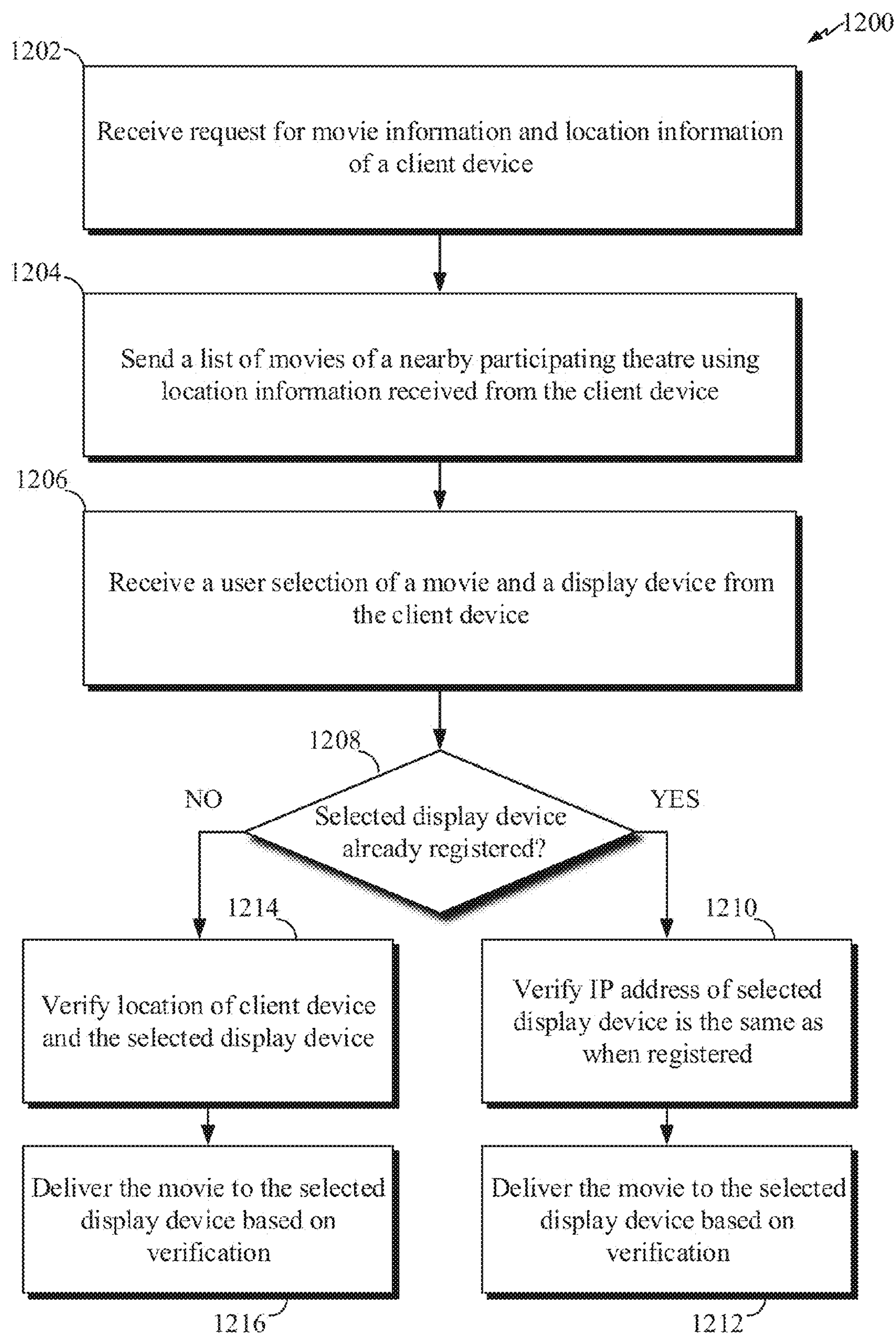
FIG. 12 illustrates an exemplary server-side registration and geolocation based content delivery process in accordance with an aspect of the disclosure.

FIG. 12 illustrates a process 1200 for registering a client device, for retrieving a list of first run movies (or other content), and for ordering a first run movie for streaming to the client device in accordance with an aspect of the disclosure. At 1202, a request for a listing of first run movies and the location information of the client device is received by session management 305. In one aspect, the location information may comprise one or more of an IP address, a MAC address, and geolocation data.

At 1204, a list of movies available for virtual seats purchases of a participating theatre located near the location information is sent to the client device. Here, it is assumed that the client device is located on the same home network as the eventual display device. At 1206, a user selection of a movie and a display device is received. In one aspect, the selected display device is the same device as the client device. For example, the client device may be game console 154 running a FRM application, which means game console 154 can both order and receive (when it selects itself as the display device) a movie stream from the geolocation based content delivery platform. In another aspect, the selected display device is a different device such as connected TV 152 or STB 156. At 1208, whether the selected display device is already registered is determined. If yes, an optional verification process is performed at 1210, which determines whether the IP address of the selected display device is the same IP address used when it first registered. This is to prevent the display device from being registered at a home location and then moved to another ineligible commercial location where the system could be exploited.

At 1212, based on the verification, the movie is delivered, streamed, or otherwise made available for download to the selected display device. If at 1208 the answer is no, then both the client device and the display device may be registered at 1214, which involves verifying the location information of the client device and the selected display device. In one aspect, a portion of the IP addresses of both devices must match and the property type associated with the geographical location of the client device must be non-commercial. In one aspect, the portion of the IP address that has to match is the first 3 digit groups of an IP address. For example, for the IP address 194.169.1.50, the first 3 digit groups are 194, 169, and 1. At 1216, the movie is delivered/streamed to the selected display device after registration.

Figure 13:
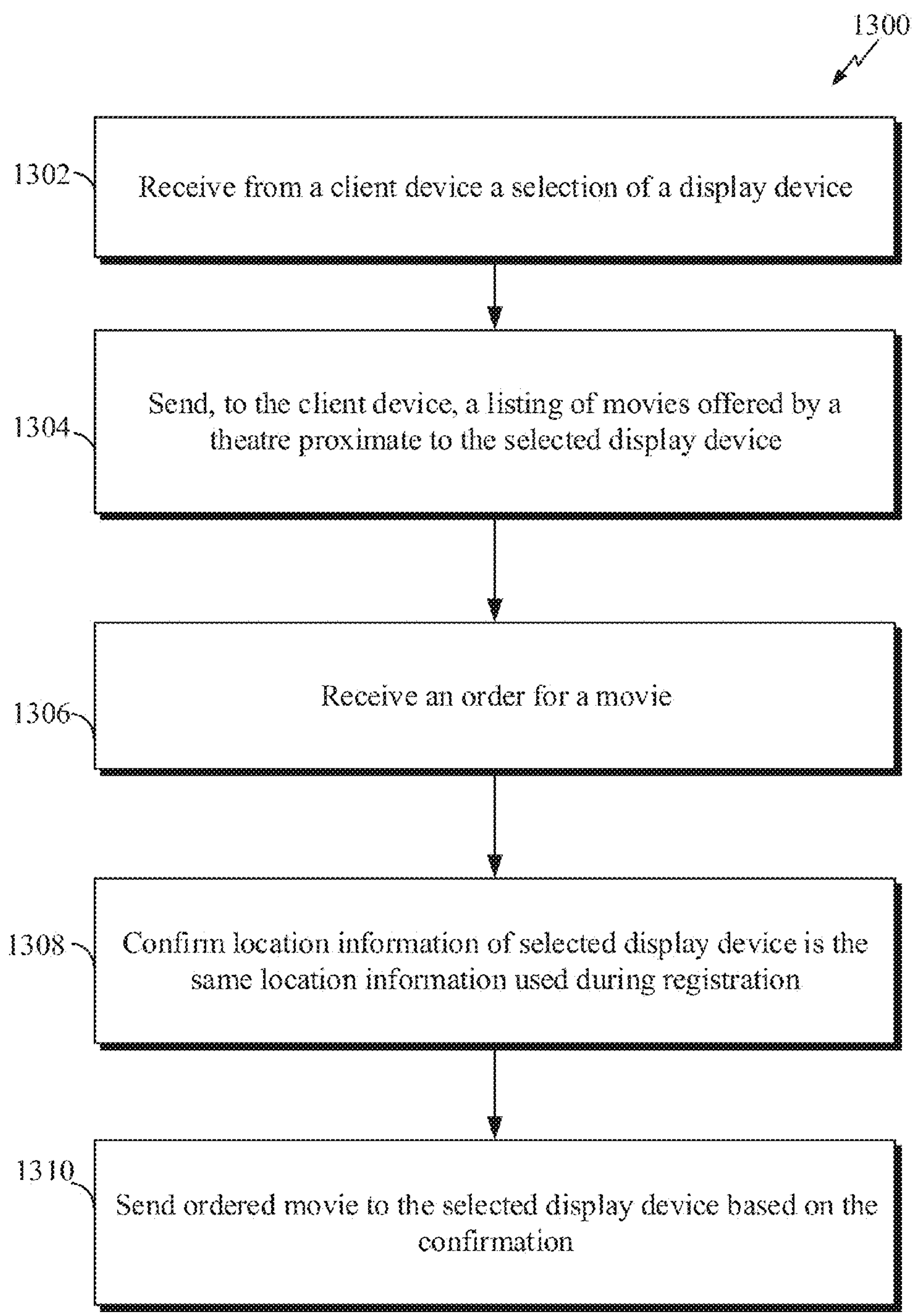
FIG. 13 illustrates an exemplary client-side geolocation based content delivery process in accordance with an aspect of the disclosure.

FIG. 13 illustrates a process 1300 for remote ordering in accordance with an aspect of the disclosure. Process 1300 may also be applicable in a multi-subscriber accounts situation. Process 1300 begins at 1302 where a selection of a display device is received from a client device. In response to the display device selection, a listing of first run movies being offered by a participating theatre near the location of the selected display device is sent to the client device at 1304. At 1306, an order for a movie is received. At 1308, the location information of the selected display device is checked with the location information used to register the same selected display device. This is to confirm whether or not they are the same device. At 1310, the movie ordered is sent to the selected display device based on the results of the confirmation at 1308.

It should be noted that each of processes 1000, 1100, 1200, and 1300 may be executed by one or more engines/modules described in processes 200 through 900. For example, at 1302, the selection may be received by session management 305 or portal 115. Additionally, at 1304, the listing of movie may be sent by session management 305 or location engine 210. At 1308, the location confirmation may be performed by ISP 135, location service 145, location engine 210, or by session management 305.

Additionally, although each of the processes above is described in terms of first run movies, it should be noted that other content such as concerts, plays, sporting events, etc., may be purchased and streamed to virtual seats or client devices located outside of the venue, but within the venue geographical distribution boundary (trade area).

Distribution Engine

Referring to FIGS. 3, 4, and 6-9, it should be noted that distribution engine 310 may an API within portal 115 or session management 305. In one aspect, distribution engine 310 is an API that is configured to communicate with CDN 120 to facilitate the order and delivery of a movie. Distribution engine 310 may also be a part of CDN 120. In one aspect, distribution engine 310 may comprise CDN 120, which may comprise servers deployed in various locations. CDN 120 may store encrypted movies provided by studio 130 and may include watermarking features/patterns as specified by session management 305.

Client Side Implementation

Figure 14:
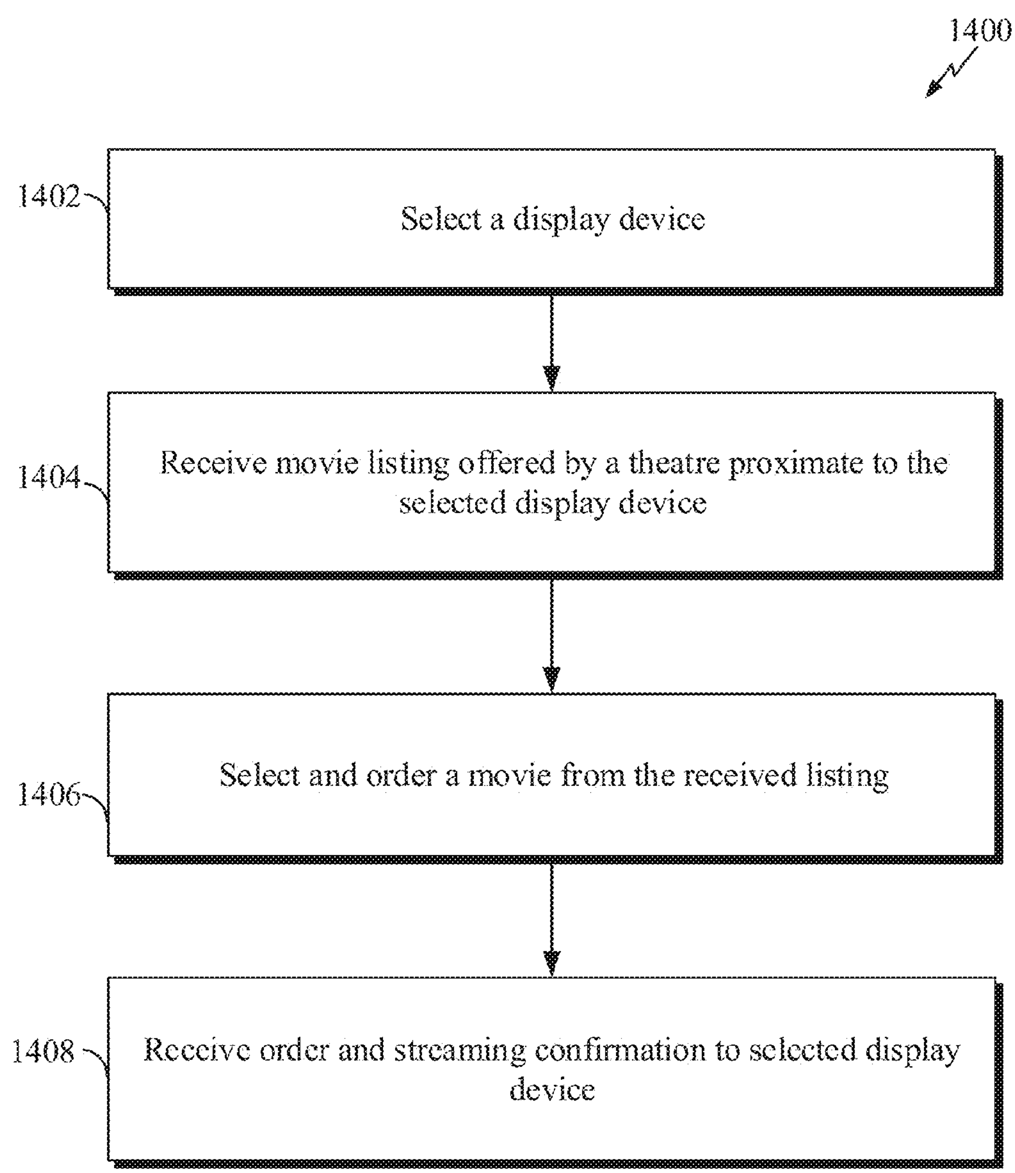
FIG. 14 illustrates an exemplary geolocation based content delivery process in accordance with an aspect of the disclosure.

FIG. 14 illustrates a process 1400 for requesting a list of first run movies (or other content) and for ordering the movie/content in accordance with one aspect of the disclosure. At 1402, a display device is selected using a mobile device such as mobile phone 140 (when away from home) or mobile device 158 (when at home). The list of available display devices may be made available to mobile phone 140 by session management 305. In one aspect, the list of available display devices is determined by determining which display devices have already been registered and associated with the current mobile device's MAC address or other means of identification.

At 1404, a list of movies available for virtual seats purchase at a participating theatre proximate to the selected display device is received at mobile device 158. At 1406, a movie is selected and ordered. At 1408, in response to the movie selection, the movie is streamed to the selected display device.

In one aspect, as long as a mobile device such as a phone, a phablet, a tablet, a laptop-tablet hybrid, etc., is associated with a residential account, it can request for a movie listing and purchase a movie on the geolocation based content delivery platform regardless of its location at the time of the purchase. In one aspect, the mobile device may be restricted to a predetermined screen size when it is away from its home location (i.e., the account owner home address). For example, any mobile device with a screen size larger than 8" will be made ineligible if it is not at its home location. Additionally, the mobile device may be required to run a FRM application where additional restriction may be applied. In one aspect, if the mobile device is away from its home location, the FRM application may disable all casting and/or screen mirroring functionalities (e.g., Chromecast, AirPlay, etc.). In this way, unauthorized group viewing on a personal device may be prevented or at least minimized.

In one aspect, a mobile device may be allowed to start receiving a movie stream regardless of its location as long as the movie was previously ordered when the mobile device was at its home location. In this way, consumers will be able to enjoy movies on the geolocation based content delivery platform while traveling (e.g., on the plane, at the hotel, etc.).

Geo-Fencing & Trade Areas Management

To encourage theatre operators to participate in the geolocation based content delivery platform, each participating theatre will be assigned their own geographic distribution boundary or trade area. Households that fall within a theatre's trade area may only obtain virtual seats from the participating theatre to which they belong. If a residence falls outside of a theatre's geographic distribution boundary, then that theatre is geo-blocked. In other words, the theatre is prevented from selling virtual seats of an event (or for a content to residence or remote devices) falling outside of its assigned trade area. This provides the participating theatre/venue operators a guaranteed customer base that they can expect to make money from by selling the virtual seats for content they are offering.

In one aspect, a theatre/venue may have a trade area with predetermined X mile radius or may be defined by zip-code boundary, neighborhood, school district, square kilometers, or major streets and highways. In another aspect, the X mile radius or X square kilometer trade area has a direct relationship with the population density of the geographic area in question. Thus, for example, in New York City, the X mile radius may be measured in city blocks or feet because of the potentially large population density where the theatre resides. However, in Des Moines, Iowa, a theatre trade area's radius might be 10 miles for example to have the same population coverage as the theatre in New York City.

Ideally, there is no overlap of trade areas when defining and assigning trade areas for theatres in an area. However, for a densely populated area with many theatres, the overlap of trade areas between different theatres may be unavoidable. When an overlap exists, complications can arise. For example, if a residence is in an overlap zone created by two adjacent trade areas belonging to two different participating theatres, the issue is then to which theatre is the residence assigned? How to determine whether a content should be made available on the geolocation based content delivery platform? Accordingly, an innovative approach is developed to address how the customer base is shared in various scenarios.

In one aspect, when the customer location (or client device) is in a non-overlapping trade area, whether a content should be made available is determined according to Table A, as shown below.

TABLE A

| Theater | Movie Currently Showing Movie Offered | Movie Previously Shown Movie Offered | Movie Never Shown Movie Offered |
|---|---|---|---|
| Partner Exhibitor | Yes | Yes | Yes |
| Non-partner Exhibitor | No | Yes | Yes |

In one aspect, when the customer location (or client device) is in an uncovered area (no defined trade area for any theatre), all new movies are generally available on the geolocation based content delivery platform.

In one aspect, if the geolocation of the remote client device falls within two or more pre-determined trade area boundaries, and one is a participant and the other is not, that household will be assigned to the nearest of the two, and, if the nearest theatre is participating, that theatre will be assigned as the nearest theatre from which that household will be able to obtain virtual seats in order to watch the content from that theatre (e.g. first run movies) in-home.

In one aspect, if the nearest theatre is a non-participating theatre, then that theatre's pre-determined X mile radius (e.g. 3 mile) trade area will be geo-fenced and protected from allowing its content to be viewed outside the theatre, (e.g. in-home using the service), within a pre-determined X mile radius trade area surrounding that theater.

In another aspect, if a household's proximity is approximately the same distance to two or more theatres located within the same trade areas or located in an overlapping trade area, where one or more theatres are participating and the others are non-participating, if the nearest theatre is the participating theatre, it will be assigned as the nearest theatre from which that household can obtain virtual seats in order to watch content (e.g. first run movies) at home. If the household's location is nearest a non-participating theatre in the overlapping trade area, then that household will not be able to obtain virtual seats from any participating theatre to watch the selected movie while the non-participating theatre is still showing the same movie.

In one aspect, when there exists an overlap trade area between two or more trade areas, whether a content should be made available is determined according to process 1500, as shown in FIG. 15. Process 1500 provides a structured way for determining how to share customers and whether a movie/content should be made available on the geolocation based content delivery platform. Process 1500 starts at step 1 by determining and confirming whether a remote seat (e.g., a client device of a consumer) is located within the overlapped portion of two or more trade areas. In step 2, the nearest participating theatre is identified. Step 3 provides a table that guides the rules for movie offering. If step 3 still has not provided an answer, then step 4 identifies the next nearest theatre. Once all of the steps (1 through 7 (C)) are performed, the question on whether a movie should be offered should be resolved.

Figure 16:
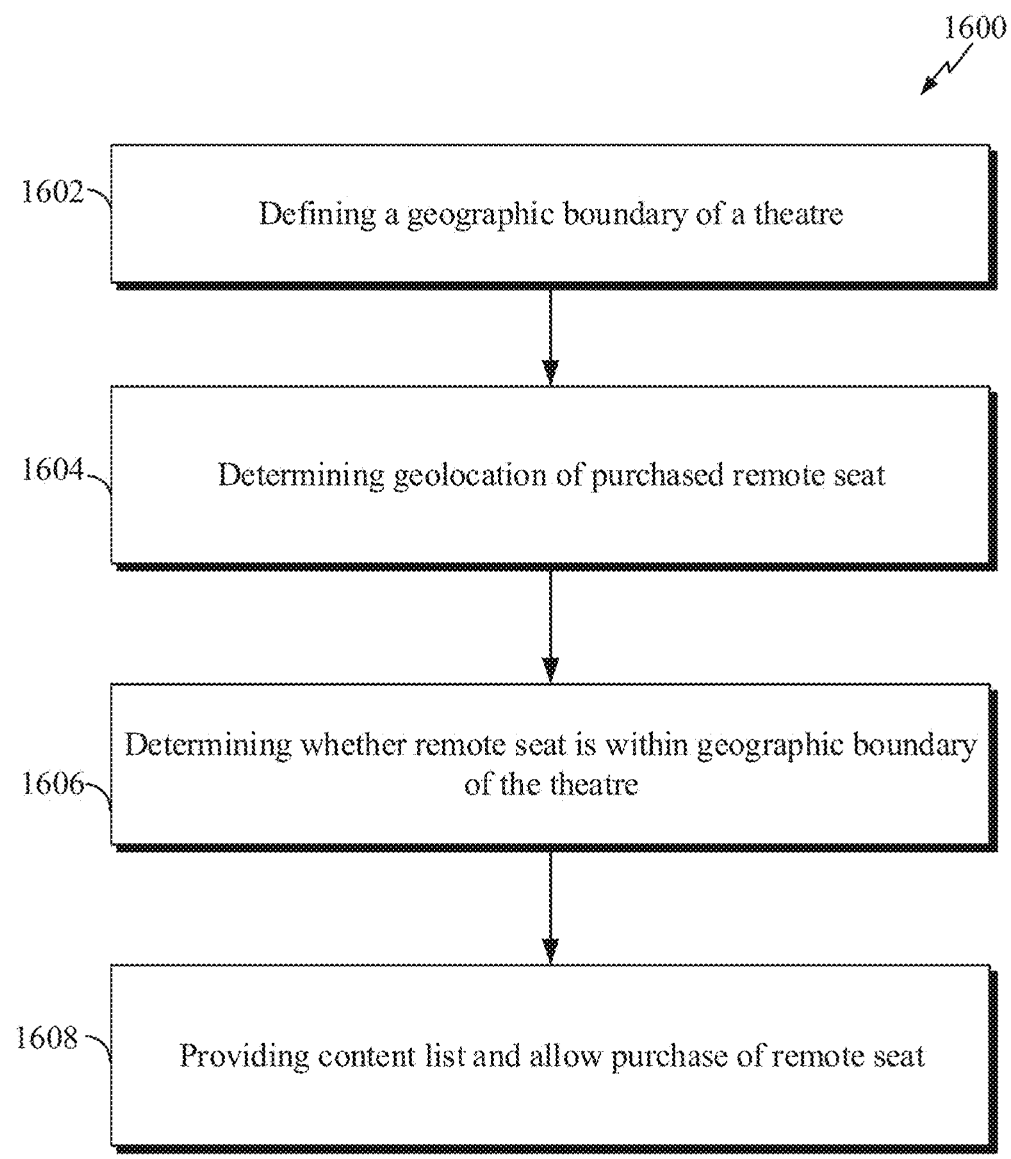
FIG. 16 illustrates an exemplary server-side remote seat purchasing process in accordance with an aspect of the disclosure.

FIG. 16 illustrates an exemplary process 1600 for purchasing a remote seat and streaming a content thereto. At 1602, the geographic distribution boundary or trade area is defined. Next, the geolocation of the remote seat or client device at the remote seat/location is determined. At 1606, a determination is made on whether the remote seat is inside a geo-fence of a participating theatre (or inside a geo-blocked area of another theatre). This may be done by location engine 210, session management 305, or in combination of both. In one aspect, a determination is also made on whether the remote seat is part of an overlapping trade area. If there is an overlap, the issues of whether a film/content should be offered to the remote seat and how the revenue is shared is guided by process 1500. If there is no overlap, then table A is controlling.

Loyalty Based Content Distribution

Figure 17:
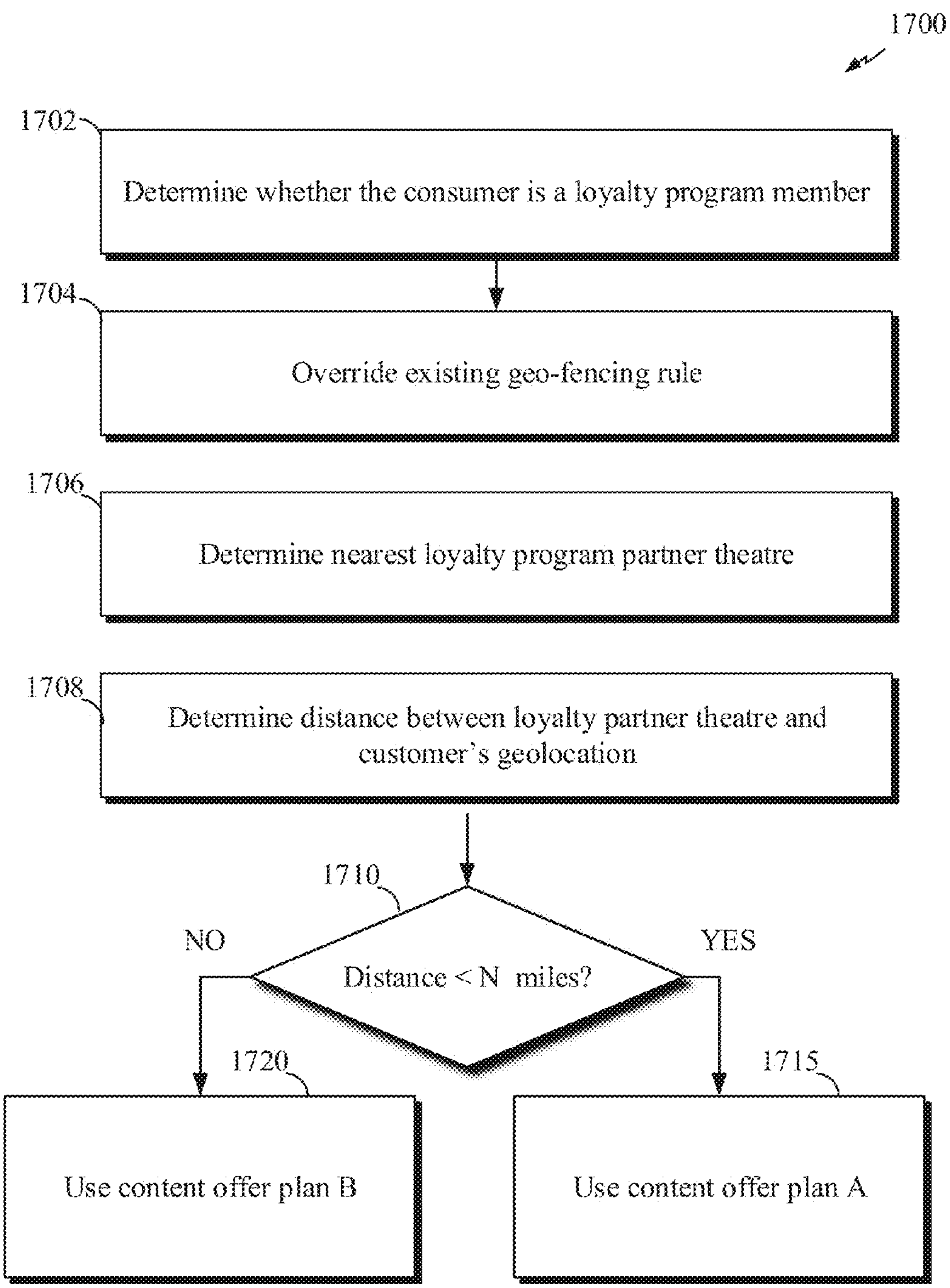
FIG. 17 illustrates an exemplary process for the loyalty partner program in accordance with an aspect of the disclosure.

For certain very loyal customers that are part of a theatre loyalty program, the typical movie offer rules do not apply. FIG. 17 illustrates an exemplary process 1700 for handling loyal customers. At 1702, a determination is made on whether the customer is part of a loyalty member program. At 1704, the geo-fencing rule governing typical customers is ignored for loyal customers. At 1706, the nearest loyalty program partner theatre is located. Next, the distance between the loyalty partner theatre and the geolocation of the remote seat is determined at 1708. If the distance is less than N miles at 1710, then the rules governing content offer and revenue sharing are controlled by plan A, which allows the movie to be purchased and the purchase credit to be assigned to the partner theatre.

If the distance at 1710 is larger than N miles, then the loyal customer may still purchase a movie but none of the theatres will get credit.

In one aspect, communication/consumption engine 1810 is configured to communicate with the remote seats or with client devices at the remote seat. Consumption engine 1810 may communicate with outside services such as IP service 135 and location services 145. Additionally, consumption engine 1810 may be configured to manage all communications between one or more engines 210, 305, 310, 350, 1820, 1822, 1824, 1826, 1830, and 1840. In another aspect, consumption engine 1810 may be part of session management 305. Although, as shown in FIG. 18, IP engine 135 and location services 145 may exist independently or one or more of these engines may be integrated with the API 1820.

Exemplary Software Module/Engine and Hardware Implementation

Figure 18:
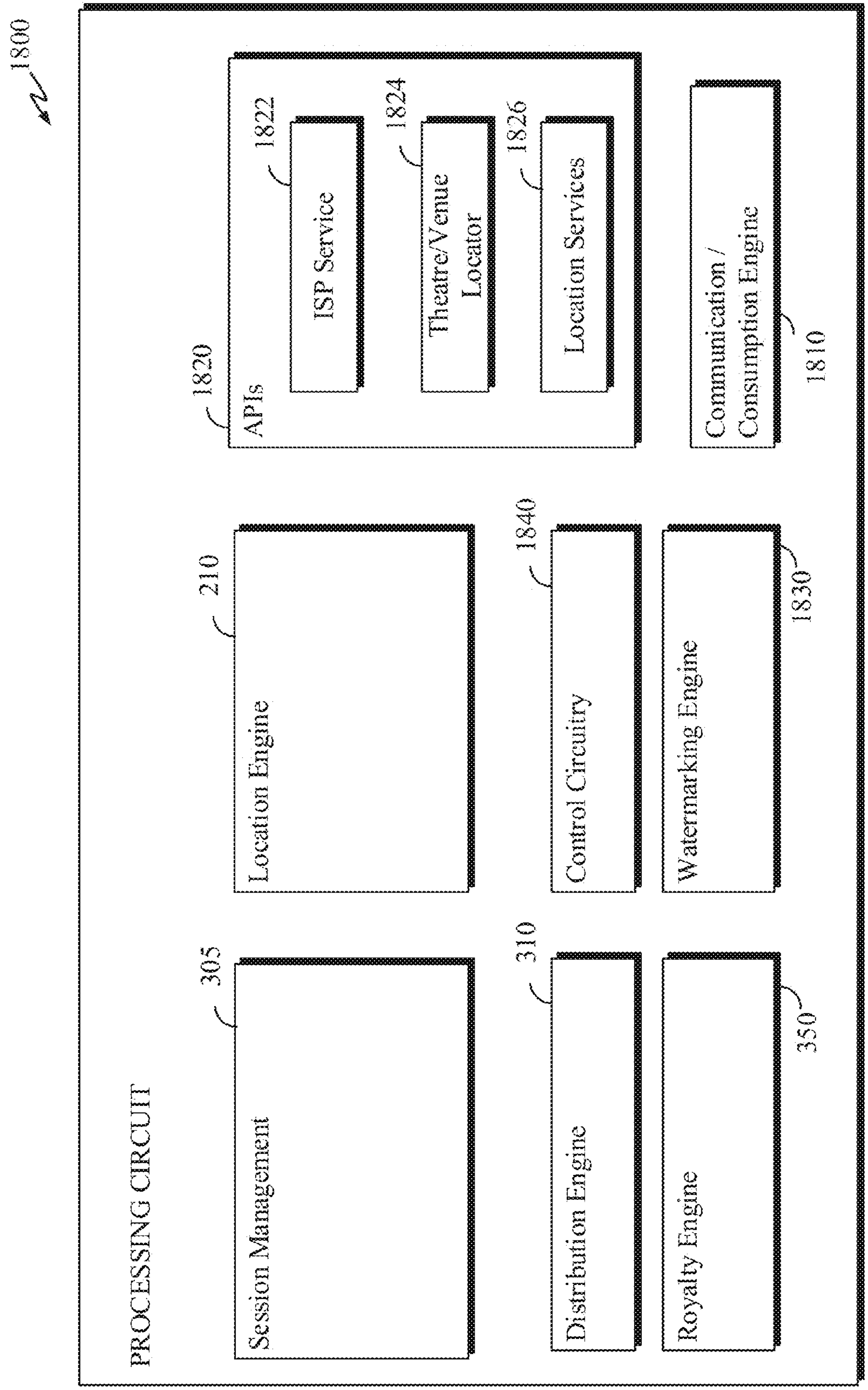
FIG. 18 is a block diagram illustrating an exemplary software module/engine and hardware implementation of the geolocation based content delivery system in accordance with an aspect of the disclosure.

FIG. 18 illustrates an exemplary processing circuit 1500 configured to implement various aspects of the present disclosure. Processing circuit 1500 includes location engine/module 210, session management 305, distribution engine 310, royalty engine 350, communication engine 1810, APIs 1820, and watermarking engine 1830. APIs 1520 comprises ISP service 1822, theatre locator 1824, and location services 1826. It should be noted that one or more modules/engines in processing circuit 1800 may reside on a memory (e.g., RAM, ROM, external memory, etc.) that is accessible by processor 500. Alternatively, one or more engines 210, 305, 310, 350, 1810, 1820, 1822, 1824, 1826, 1830, and 1840 may reside on an internal memory of processor 1800.

In one aspect, communication engine 1810 is configured to communicate with the remote seats or with client devices at the remote seat. Communication engine 1810 may communicate with outside services such as IP service 135 and location services 145. Additionally, communication engine 1810 may be configured to manage all communications between one or more engines 210, 305, 310, 350, 1820, 1822, 1824, 1826, 1830, and 1840. In another aspect, consumption engine 1810 may be part of session management 305. Although, as shown in FIG. 18, IP engine 135 and location services 145 may exist independently or one or more of these engines may be integrated with the API 1820.

Figure 19:
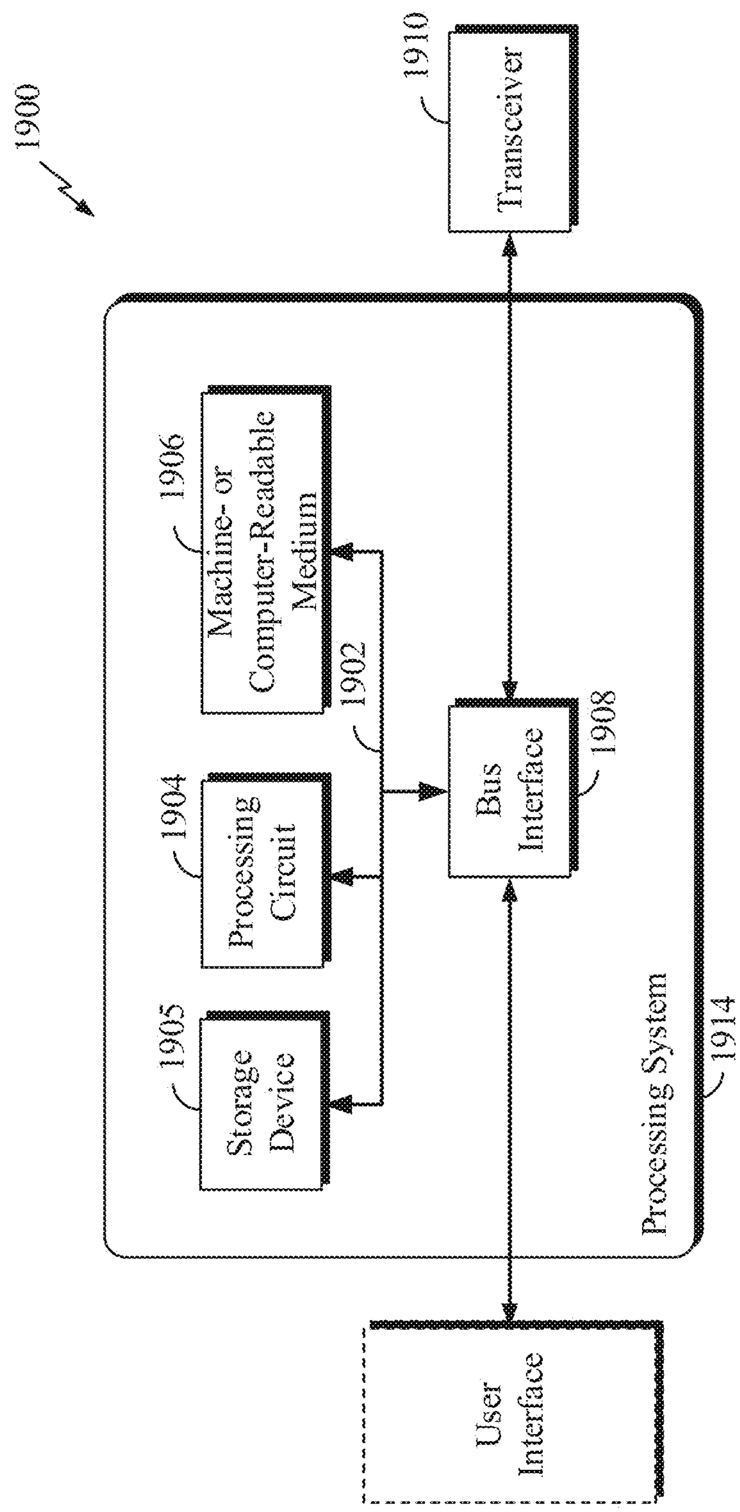
FIG. 19 is a block diagram illustrating an exemplary of a hardware implementation of a geolocation based content delivery method and system that may employ the methods and processes of FIGS. 2-17 in accordance with one or more aspects of the disclosure.

FIG. 19 illustrates an overall system or apparatus 1900 in which processes 200 through 1400 may be implemented. In accordance with various aspects of the disclosure, an element, or any portion of an element, or any combination of elements may be implemented with a processing system 1914 that includes one or more processing circuits 1904. Processing circuits 1904 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1904 may be used to implement any one or more of the processes described above and illustrated in FIGS. 2 through 14.

In the example of FIG. 19, the processing system 1914 may be implemented with a bus architecture, represented generally by the bus 1902. The bus 1902 may include any number of interconnecting buses and bridges depending on the specific application of the processing system 1914 and the overall design constraints. The bus 1902 links various circuits including one or more processing circuits (represented generally by the processing circuit 1904), the storage device 1905, and a machine-readable, processor-readable, processing circuit-readable or computer-readable media (represented generally by a non-transitory machine-readable medium 1906.) The bus 1902 may also link various other circuits such as timing sources, peripherals, voltage regulators, and power management circuits, which are well known in the art, and therefore, will not be described any further. The bus interface 1908 provides an interface between bus 1902 and a transceiver 1910. The transceiver 1910 provides a means for communicating with various other apparatus over a transmission medium. Depending upon the nature of the apparatus, a user interface 1912 (e.g., keypad, display, speaker, microphone, touchscreen, motion sensor) may also be provided.

The processing circuit 1904 is responsible for managing the bus 1902 and for general processing, including the execution of software module/engine stored on the machine-readable medium 1906. The software module/engine, when executed by processing circuit 1904, causes processing system 1914 to perform the various functions described herein for any particular apparatus. Machine-readable medium 1906 may also be used for storing data that is manipulated by processing circuit 1904 when executing software module/engine.

One or more processing circuits 1904 in the processing system may execute software module/engine or software module/engine components. Software module/engine shall be construed broadly to mean instructions, instruction sets, code, code segments, program code, programs, subprograms, software module/engines/engines, applications, software module/engine applications, software module/engine packages, routines, subroutines, objects, executables, threads of execution, procedures, functions, etc., whether referred to as software module/engine, firmware, middleware, microcode, hardware description language, or otherwise. A processing circuit may perform the tasks. A code segment may represent a procedure, a function, a subprogram, a program, a routine, a subroutine, an engine, a module, a software module/engine package, a class, or any combination of instructions, data structures, or program statements. A code segment may be coupled to another code segment or a hardware circuit by passing and/or receiving information, data, arguments, parameters, or memory or storage content. Information, arguments, parameters, data, etc. may be passed, forwarded, or transmitted via any suitable means including memory sharing, message passing, token passing, network transmission, etc.

The software module/engine may reside on machine-readable medium 1906. The machine-readable medium 1906 may be a non-transitory machine-readable medium. A non-transitory processing circuit-readable, machine-readable or computer-readable medium includes, by way of example, a magnetic storage device (e.g., hard disk, solid-state drive), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software module/engine and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software module/engine and/or instructions that may be accessed and read by a computer.

The machine-readable medium 1906 may reside in the processing system 1914, external to the processing system 1914, or distributed across multiple entities including the processing system 1914. The machine-readable medium 1906 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software module/engine and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, engines, and algorithm steps described in connection with the aspects disclosed herein may be implemented as electronic hardware, computer software module/engine, or combinations of both. To clearly illustrate this interchangeability of hardware and software module/engine, various illustrative components, blocks, modules, engines, circuits, and steps have been described above generally in terms of their functionality. Whether such functionality is implemented as hardware or software module/engine depends upon the particular application and design constraints imposed on the overall system.

The methods or algorithms described in connection with the examples disclosed herein may be embodied directly in hardware, in a software module/engine/engine executable by a processor, or in a combination of both, in the form of processing unit, programming instructions, or other directions, and may be contained in a single device or distributed across multiple devices. A software module/engine may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While certain exemplary embodiments have been described and shown in the accompanying drawings, it is to be understood that such embodiments are merely illustrative of and not restrictive on the broad invention, and that this invention should not be limited to the specific constructions and arrangements shown and described, since various other modifications are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A method for a first venue to provide content to one or more remote viewers of the first venue at one or more remote seats located outside of said first venue and within a geographic distribution boundary of the first venue, the method comprising:

defining the geographic boundary of the first venue, said geographic distribution boundary corresponding to a geographic area relating to the first venue, said geographic boundary being different from a geographic distribution boundary of a second venue, wherein the first and second venues comprise movie theatres;

determining, using a location engine, a geolocation of the one or more remote seats corresponding to said one or more remote viewers;

determining, using said location engine, whether the geolocation of said one or more remote seats is within said geographic distribution boundary of the first venue; and providing said content, using a distribution engine, to each of said remote seats determined to be within said geographic boundary of said first venue, wherein determining whether the geolocation of said one or more remote seats is within said geographic distribution boundary of the first venue comprises, for each of said one or more remote seats, receiving an IP address and a MAC address of a display device at the respective remote seat, and obtaining a geolocation data of a location services enabled device connected to a same local area network as the display device, wherein the geolocation data does not consist of an IP address or a MAC address of the location services enabled device, and wherein the location services enabled device includes GPS or Bluetooth used for obtaining the geolocation data.

2. The method of claim 1, wherein said geographic distribution boundary of said first venue does not overlap said geographic distribution boundary of said second venue.

3. The method of claim 1 further comprising determining, using said location engine, whether the geolocation of said one or more remote seats is within said geographic distribution boundary of the second venue, wherein said one or more remote seats determined to be within the geographic distribution boundary of the second venue are not eligible to receive content from the first venue.

4. The method of claim 1, wherein providing said content comprises streaming the content to each of said remote seats determined to be within said geographic distribution boundary of said first venue using the distribution engine, wherein the content is a multimedia content.

5. The method of claim 1, further comprising determining a property type at the geolocation of each of said remote seats, wherein content is only provided to a residential property type or a mobile device associated to the residential property.

6. The method of claim 1, wherein determining the geolocation of each of said remote seats further comprises:

receiving an IP address from the location services enabled device;

verifying a property type at a geographical location of the geolocation data of the location services enabled device; and determining whether the IP address of the display device matches with the IP address of the location services enabled device, wherein said content is provided to said one or more remote seats when there is a match.

7. The method of claim 1, further comprising:

providing a list of content available at the first venue to each of said remote seats within said geographic distribution boundary of said first venue; and receiving a content selection from one of said remote seats in response to providing the list.

8. The method of claim 7, wherein providing the list of content further comprises:

determining a venue relationship between the first venue and one or more content producers; and modifying the list of available content based on the determined venue relationship.

9. The method of claim 8, wherein the venue relationship comprises one of a venue participation status and whether a content was previously shown, currently showing or never shown.

10. The method of claim 7, wherein the match is determined based on the first 3 digit groups of the IP addresses.

11. The method of claim 10, wherein the verifying the property type uses a location verification service.

12. The method of claim 1, wherein the geolocation data consists of a longitude or a latitude of the location services enabled device, a triangulation data from a plurality of nearby cell towers, or a combination thereof.

13. A computer-based system that enables a first venue to provide content to one or more remote viewers of the first venue at one or more remote seats located outside of said first venue and within a geographic distribution boundary of the first venue, the system comprising:

a processor, a memory operably connected to the processor and having stored thereon instructions which, when executed on the processor, causes the system to implement:

a venue database stored on a non-transitory medium, the database containing geographic distribution boundaries of a plurality of venues;

a location engine comprising an application programming interface programmed to:

determine, for the one or more remote viewers of the first venue, a geolocation of the one or more remote seats corresponding to said remote viewers; said geographic distribution boundary of the first venue being different from a geographic distribution boundary of a second venue, wherein the first and second venues comprise movie theatres; and determine whether the geolocation of said sat remote seats is within said geographic distribution boundary of the first venue; and a distribution engine comprising an application programming interface programmed to provide said content to each of said remote seats determined to be within said geographic distribution boundary of said first venue, wherein determining whether the geolocation of said one or more remote seats is within said geographic distribution boundary of the first venue comprises, for each of said one or more remote seats, receiving an IP address and a MAC address of a display device at the respective remote seat, and obtaining a geolocation data of a location services enabled device connected to a same local area network as the display device, wherein the geolocation data does not consist of an IP address or a MAC address of the location services enabled device, and wherein the location services enabled device includes GPS or Bluetooth used for obtaining the geolocation data.

14. The system of claim 13, wherein said geographic distribution boundary of said first venue does not overlap with a geographic boundary of said second venue.

15. The system of claim 13, wherein the location engine is further configured to determine whether the geolocation of said one or more remote seats is within said geographic distribution boundary of the second venue, wherein said one or more remote seats determined to be within the geographic distribution boundary of the second venue are not eligible to receive content from the first venue.

16. The system of claim 13, wherein the distribution engine is configured to stream the content to each of said remote seats determined to be within said geographic distribution boundary of said first venue, wherein the content is a multimedia content.

17. The system of claim 13, wherein the location engine is further configured to determine a property type at the geolocation of each of said remote seats, wherein content is only provided to a residential property type.

18. The system of claim 13, wherein the location engine is further configured to:

receive geolocation data and an IP address from a second device located at the respective location of each of said remote seats;

verify a property type at a geographical location of the geolocation data of the second device; and determine whether the IP address of the display device matches with the IP address of the second device, wherein said content is provided to said one or more seats when there is a match.

19. The system of claim 13, further comprising a communication engine configured to:

provide a list of content available at the first venue to each of said remote seats within said geographic distribution boundary of said first venue; and receive a content selection from one of said remote seats in response to providing the list.

20. The system of claim 19, wherein the provided list of content is based on a venue relationship between the first venue and one or more content producers.

21. The system of claim 20, wherein the venue relationship comprises one of a venue participation status and whether a content is shown.

22. The system of claim 18, wherein the match is determined based on the first 3 digit groups of the IP addresses.

23. The system of claim 22, wherein the verifying the property type uses a location verification service.

24. The system of claim 13, wherein the geolocation data consists of a longitude or a latitude of the location services enabled device, a triangulation data from a plurality of nearby cell towers, or a combination thereof.

* * * * *